US011933329B2

(12) United States Patent
Kitagawa

(10) Patent No.: US 11,933,329 B2
(45) Date of Patent: Mar. 19, 2024

(54) PNEUMATIC ACTUATOR

(71) Applicant: Ato Kitagawa, Tokyo (JP)

(72) Inventor: Ato Kitagawa, Tokyo (JP)

( * ) Notice: Subject to any disclaimer, the term of this patent is extended or adjusted under 35 U.S.C. 154(b) by 0 days.

(21) Appl. No.: 17/849,944

(22) Filed: Jun. 27, 2022

(65) Prior Publication Data

US 2022/0333621 A1 Oct. 20, 2022

Related U.S. Application Data

(63) Continuation of application No. PCT/JP2020/048748, filed on Dec. 25, 2020.

(30) Foreign Application Priority Data

Dec. 27, 2019 (JP) ................................ 2019-239641

(51) Int. Cl.
*F15B 15/14* (2006.01)
*F15B 11/036* (2006.01)

(52) U.S. Cl.
CPC ............ *F15B 15/14* (2013.01); *F15B 11/036* (2013.01); *F15B 11/0365* (2013.01); *F15B 15/1404* (2013.01)

(58) Field of Classification Search
CPC ... F15B 11/024; F15B 11/036; F15B 11/0365; F15B 15/1404; F15B 2211/7055; F15B 2211/7056; F15B 2211/7107
See application file for complete search history.

(56) References Cited

U.S. PATENT DOCUMENTS 2,699,651 A * 1/1955 Douglas ................ F15B 11/046 60/382
3,171,331 A * 3/1965 Walter .................. F15B 11/042 91/519
6,029,450 A 2/2000 Wittich
(Continued)

FOREIGN PATENT DOCUMENTS

DE 102006034645 A1 1/2008
DE 102014007439 A1 11/2015
(Continued)

OTHER PUBLICATIONS

DE102014007439A1_t machine translation thereof (Year: 2015).*
(Continued)

*Primary Examiner* — Abiy Teka
*Assistant Examiner* — Matthew Wiblin
(74) *Attorney, Agent, or Firm* — CANTOR COLBURN LLP

(57) ABSTRACT

The first piston of the first cylinder and the second piston of the second cylinder are connected so that the first piston and the second piston have the same displacement. The cross-section area of one side of the first piston is the smallest, and the cross-section area on the same side of the second piston is the third smallest. The two air chambers of the first cylinder and the two air chambers of the second cylinder are referred to as a first air chamber, a second air chamber, a third air chamber, and the fourth air in ascending order in the cross-section area. The control valve connects the air pressure source to the first air chamber, connects the second air chamber to the third air chamber, and opens the fourth air chamber to the atmosphere in the forward stroke.

9 Claims, 17 Drawing Sheets

(56) References Cited

U.S. PATENT DOCUMENTS

| | | | | |
|---|---|---|---|---|
| 6,227,112 B1 * | 5/2001 | Becker | .................... | B41F 13/00<br>101/230 |
| 2021/0139134 A1 * | 5/2021 | Atkins | .................... | B64C 27/64 |

FOREIGN PATENT DOCUMENTS

| | | |
|---|---|---|
| JP | H08226401 A | 9/1996 |
| JP | 2013199869 A | 10/2013 |

OTHER PUBLICATIONS

International Search Report for International Application No. PCT/JP2020/048748; dated Mar. 2, 2021.

PCT International Preliminary Report on Patentability with Written Opinion of the International Searching Authority for International Application No. PCT/JP2020/048748; dated Mar. 2, 2021.

* cited by examiner

-- Prior Art --

-- Prior Art --

-- Prior Art --

-- Prior Art --

RETURN STROKE

-- Prior Art --

FORWARD STROKE

-- Prior Art --

-- Prior Art --

PNEUMATIC ACTUATOR

CROSS REFERENCE TO RELATED APPLICATIONS

This application is a continuation under 35 U.S.C. § 120 of PCT/JP2020/048748 filed Dec. 25, 2020, which is incorporated herein by reference, and which claimed priority to Japanese Application No. 2019-239641 filed on Dec. 27, 2019. The present application likewise claims priority under 35 U.S.C. § 119 to Japanese Application No. 2019-239641, filed on Dec. 27, 2019, the entire content of which is also incorporated herein by reference.

BACKGROUND

1. Technical Field

The present disclosure relates to pneumatic actuators.

2. Description of the Related Art

The pneumatic actuator has a simple structure compared to other actuators and has the advantages of being inexpensive and lightweight. In addition, the pneumatic actuator can easily generate a large force. Furthermore, the air used by the pneumatic system is inexhaustible and clean. For these reasons, pneumatic systems using pneumatic actuators are used in assembly devices and transport devices in various factories such as automobiles, semiconductors, and foods. Further, unlike an electric actuator, a pneumatic actuator does not generate a magnetic field or an electric field and is therefore suitable for applications that avoid a magnetic field or an electric field.

On the other hand, the pneumatic actuator has a disadvantage of low energy efficiency because it is necessary to release compressed air to the atmosphere as it is. Because of this shortcoming, the movement to replace pneumatic actuators with electric actuators has begun in recent years.

SUMMARY

The present disclosure has been made in such circumstances.

One embodiment of the present disclosure relates to a pneumatic cylinder. The pneumatic cylinder includes a first cylinder, a second cylinder and a control valve. The first cylinder includes a first cylinder tube and a first piston that divides the space in the first cylinder tube into two air chambers. The second cylinder includes a second cylinder tube, a second piston that divides the space in the second cylinder tube into two air chambers. The second piston is coupled to the first piston so that the first piston and the second piston have the same displacement. Among two pressure receiving surfaces of the first piston and two pressure receiving surfaces of the second piston, the cross-section area of one of the two pressure receiving surface of the first piston is the smallest, and the cross-section area of one of the two pressure receiving surface of the second piston is the third smallest. The two air chambers of the first cylinder and the two air chambers of the second cylinder are referred to as a first chamber, a second chamber, a third chamber, and a fourth chamber in ascending order in cross-section area, respectively. The control valve is structured to connect an air pressure source to the first air chamber, to connect the second air chamber to the third air chamber, and to open the fourth air chamber to the atmosphere in forward stroke One embodiment of the preset disclosure also relates to a pneumatic cylinder. The pneumatic cylinder includes a plurality of N (N≥2) cylinders and a control valve. Each of the N cylinders includes a cylinder tube and a piston that divides the space inside the cylinder tube into two air chambers. The pistons of each of the N cylinders are connected so that the displacements are equal, that is, the displacements are interlocked. Among the all pressure receiving surfaces of the pistons of each of the N cylinders, a cross-section area of one pressure receiving surface of the i-th (1≤i≤N) pistons is the (2i−1)th smallest. The two air chambers of each of the N cylinders are referred to as a first air chamber, a second air chamber, . . . , a (2N−1)th air chamber, and a (2N)th air chamber in ascending order in cross-section area, respectively. The control valve is structured (i) to connect the air pressure source to the first air chamber, to open the (2N)th air chamber to the atmosphere, and to connect adjacent pair among the second air chamber through the (2N−1)th air chamber in the forward stroke.

It is to be noted that any arbitrary combination or rearrangement of the above-described structural components and so forth is effective as and encompassed by the present embodiments. Moreover, this summary does not necessarily describe all necessary features so that the disclosure may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 13 is a diagram showing the relationship between the output magnification of the double-acting double cylinder actuator and a.

FIG. 14 is a diagram showing the relationship between the output magnification of a single-acting double cylinder actuator and a.

DETAILED DESCRIPTION

Outline of Embodiments

Figure 1:
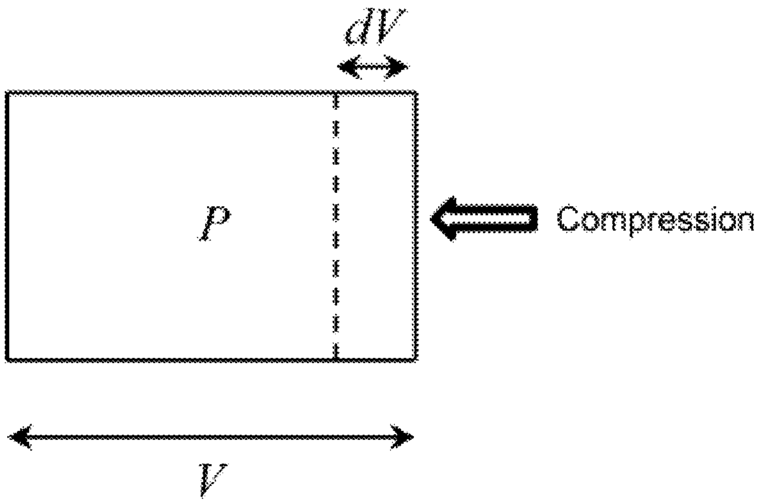
FIG. 1 is a diagram illustrating the energy required for compressing air.

An overview of some exemplary embodiments of the present disclosure will be given. This overview simplifies and describes some concepts of one or more embodiments for the purpose of basic understanding of embodiments, as a prelude to the detailed description described below, and is an invention or disclosure. It does not limit the size. Also, this overview is not a comprehensive overview of all possible embodiments and does not limit the essential components of the embodiment. For convenience, "one embodiment" may be used to refer to one or more embodiments disclosed herein.

The pneumatic cylinder according to one embodiment includes a first cylinder, a second cylinder and a control valve. The first cylinder includes a first cylinder tube and a first piston that divides the space in the first cylinder tube into two air chambers. The second cylinder includes a second cylinder tube and a second piston that divides the space in the second cylinder tube into two air chambers. The second piston is connected to the first piston so that the first piston and the second piston have the same displacement. Among the two pressure receiving surfaces of the first piston and the two pressure receiving surfaces of the second piston, one of the two pressure receiving surfaces of the first piston has the smallest cross-section area, and one of the two pressure receiving surfaces of the second piston has the third smallest cross-section area. The two air chambers of the first cylinder and the two air chambers of the second cylinder are referred to as, in ascending order in the cross-section area, a first air chamber, a second air chamber, a third air chamber, and a fourth air chamber respectively. In the forward stroke, the control valve connects an air pressure source to the first air chamber, connects the second air chamber to the third air chamber, and opens the fourth air chamber to the atmosphere.

In this configuration, the second air chamber and the third air chamber behave as a differential circuit. Therefore, when compressed air remains in the second air chamber and the third air chamber immediately before the forward stroke, the energy of the compressed air is effectively used by expanding them and using them as the driving force of the piston, and the efficiency of the pneumatic cylinder can be increased. Further, the resultant force of the total output of the two cylinders at this time is larger than that of the single cylinder.

In one embodiment, the control valve may connect the first air chamber and the second air chamber to the air pressure source and connect the third air chamber to the fourth air chamber in the return stroke. In this embodiment, the pneumatic cylinder functions as a double acting cylinder. In the return stroke, the pair of the first air chamber and the second air chamber and the pair of the third air chamber and the fourth air chamber act as a differential circuit, and while effectively utilizing the energy of the remaining compressed air, the output in the return direction can be obtained. Further, the resultant force of the total output of the two cylinders at this time is larger than that of the single cylinder.

In one embodiment, in the return stroke the control valve may connect the first air chamber to the second air chamber in a state of being separated from the air pressure source and connect the third air chamber to the fourth air chamber. In this embodiment, the pneumatic cylinder functions as a single-acting cylinder that does not consume compressed air in the return stroke. In the return stroke, the pair of the first air chamber and the second air chamber and the pair of the third air chamber and the fourth air chamber act as a differential circuit, and while effectively utilizing the energy of the remaining compressed air, the output in the return direction can be obtained.

In one embodiment, the first cylinder and the second cylinder may be arranged non-coaxially. In this case, the axial dimension of the pneumatic cylinder can be reduced.

In one embodiment, the first air chamber and the second air chamber may be formed in the same cylinder, and the third air chamber and the fourth air chamber may be formed in the same cylinder.

In one embodiment, the first cylinder and the second cylinder may be single rod cylinders. This can reduce the cost.

In one embodiment, the first cylinder and the second cylinder may be arranged coaxially.

In one embodiment, the first air chamber, the second air chamber, the third air chamber, and the fourth air chamber may be arranged in order in the axial direction.

In one embodiment, the third air chamber, the fourth air chamber, the first air chamber, and the second air chamber may be arranged in order in the axial direction.

In one embodiment, the first air chamber, the fourth air chamber, the third air chamber, and the second air chamber may be arranged in order in the axial direction.

In one embodiment, the third air chamber, the second air chamber, the first air chamber, and the fourth air chamber may be arranged in order in the axial direction.

In one embodiment, the control valve may include a 4-port first control valve and a 4-port second control valve. In the first position, the first port communicates with the second port, and the third port and the fourth port are closed. In the second position, the first port and the second port are closed, and the fourth port communicates with the third port. The first port and the third port of the first control valve are connected to the second air chamber, the second port of the first control valve is connected to the third air chamber and the fourth port of the second control valve. The fourth port of the first control valve is connected to the first air chamber and the air pressure source, the first port and the third port of the second control valve are connected to the fourth air chamber, and the second port of the second control valve is connected to the atmosphere. Regarding the double-acting cylinder, the first control valve and the second control valve can be configured by using commercially available products (four-port directional control valve or two two-port directional control valves), respectively.

EMBODIMENTS

Description will be made below regarding the present disclosure based on preferred embodiments with reference to the drawings. The same or similar components, members, and processes are denoted by the same reference numerals, and redundant description thereof will be omitted as appropriate. The embodiments have been described for exemplary purposes only and are by no means intended to restrict the present disclosure. Also, it is not necessarily essential for the present disclosure that all the features or a combination thereof be provided as described in the embodiments.

In addition, the dimensions (thickness, length, width, etc.) of each member shown in the drawings may be appropriately enlarged or reduced for ease of understanding. Furthermore, the dimensions of the plurality of members do not necessarily represent the magnitude relationship between them, and even if one member A is drawn thicker than another member B on the drawing, the member A is the member B. It can be thinner than.

1. 1. Efficiency of Conventional Pneumatic Actuators

First, consider the efficiency of conventional pneumatic actuators.

The compressed air used for the pneumatic system is usually 0.7 MPa (gauge) [=0.8 MPa (abs)], which is created by compressing the air in the atmospheric pressure (0.1 MPa (abs)) state with a compressor.

FIG. 1 is a diagram illustrating the energy required for compressing air. The energy dE required to compress air having a pressure P and a volume V by dV is expressed by the equation (1).

$$dE=-PdV \tag{1}$$

On the other hand, the change in the state of air is expressed by the equation (2), where T is the temperature and R is the gas constant.

$$PV=RT \tag{2}$$

The actual state change is not an isothermal change, but an adiabatic change or a polytropic change, but for ease of understanding or simplification of the explanation, an isothermal change is assumed. This assumption is useful in obtaining approximate values, as the final air temperature converges to the ambient temperature if the event is viewed on a somewhat long time scale. Assuming an isothermal change, since dPV+pdV=dT=0, the equation (1) becomes the equation (3). When it is integrated, Eq. (4) is obtained.

$$dE=-PdV=VdP=\frac{RT}{P}dP \tag{3}$$

$$E=\int_{P_a}^{P}\frac{RT}{P}dP=RT[\ln P]_{P_a}^{P}=RT\ln\left(\frac{P}{P_a}\right)=PV\ln\left(\frac{P}{P_a}\right) \tag{4}$$

Therefore, the energy $E_0$ required to compress the air at atmospheric pressure Pa=0.1 [MPa (abs)] to the air having a volume V at the pressure Ps=0.8 [MPa (abs)] is expressed by the equation (5) when the state change is an isothermal change.

$$E_0=P_sV\ln\left(\frac{P_s}{P_a}\right)=P_sV\ln\left(\frac{0.8}{0.1}\right)\approx 2P_sV \tag{5}$$

Next, the efficiency of the pneumatic actuator will be described using a pneumatic cylinder as an example.

Figure 2A:
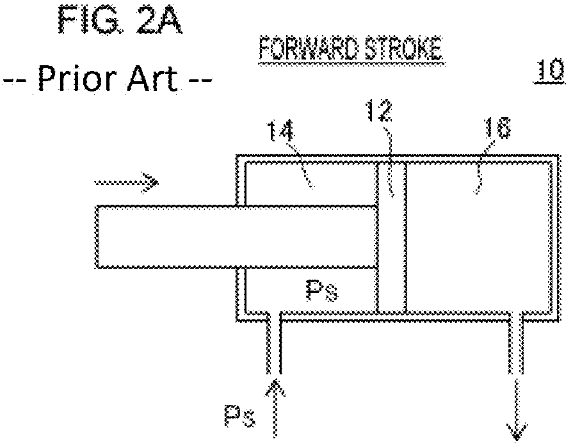
FIG. 2A and FIG. 2B are diagrams illustrating the operation of a pneumatic cylinder.
Figure 2B:
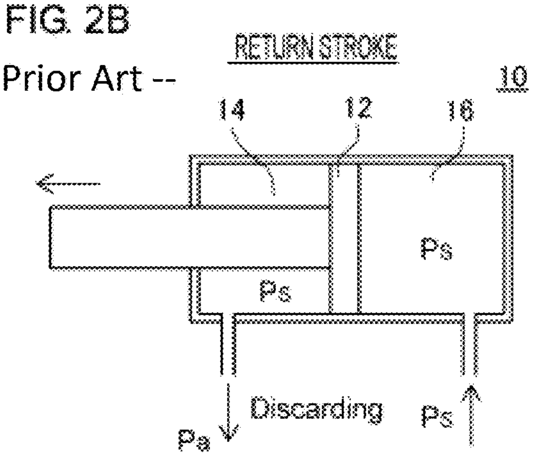

FIG. 2A and FIG. 2B are diagrams illustrating the operation of the pneumatic cylinder 10. FIG. 2A shows the forward stroke, and FIG. 2B shows the return stroke. The internal space of the pneumatic cylinder 10 is divided into a left chamber 14 and a right chamber 16 by a piston 12.

As shown in FIG. 2A, compressed air is supplied to the left chamber 14 and the right chamber 16 is opened to the atmosphere in the forward stroke. Then, when the piston 12 reaches the right end, the supply of compressed air is stopped. At this time, the air pressure in the left chamber 14 is Ps.

Next, in the return stroke shown in FIG. 2B, the left chamber 14 is opened to the atmosphere, and the compressed air of the pressure Ps remaining in the left chamber 14 is discarded to the outside. Otherwise, the return stroke will not work properly. In this case, the energy (work) E obtained by air pressure during the forward stroke is expressed by the equation (6), where V is the volume of the left chamber 14.

$$E=P_SV \tag{6}$$

Therefore, the energy efficiency η can be obtained from the equations (5) and (6) as in the equation (7) when the compressed air is discarded in the return stroke.

$$\eta=\frac{E}{E_0}\approx\frac{P_sV}{2P_sV}=0.5 \tag{7}$$

In other words, the efficiency is about 0.5 at the maximum according to the simple calculation. The reason why the efficiency is low is that the high-pressure air in the left chamber 14 is discharged to the outside as it is during the return stroke.

2. Differential Circuit

In the pneumatic cylinder according to the embodiment described below, the energy efficiency is greatly increased by using the expansion process of the high pressure air for driving the cylinder without discarding the high pressure air as it is at high pressure. However, as the air expands, the pressure decreases and it cannot be used as a sufficient driving force. Therefore, some ingenuity is required to use the air in the expansion process for driving.

2.1 Differential Circuit in the Hydraulic System

In order to understand the pneumatic cylinder according to the embodiment, it is indispensable to understand the differential circuit often used in the hydraulic circuit. Therefore, this section describes the differential circuit.

Figure 3B:
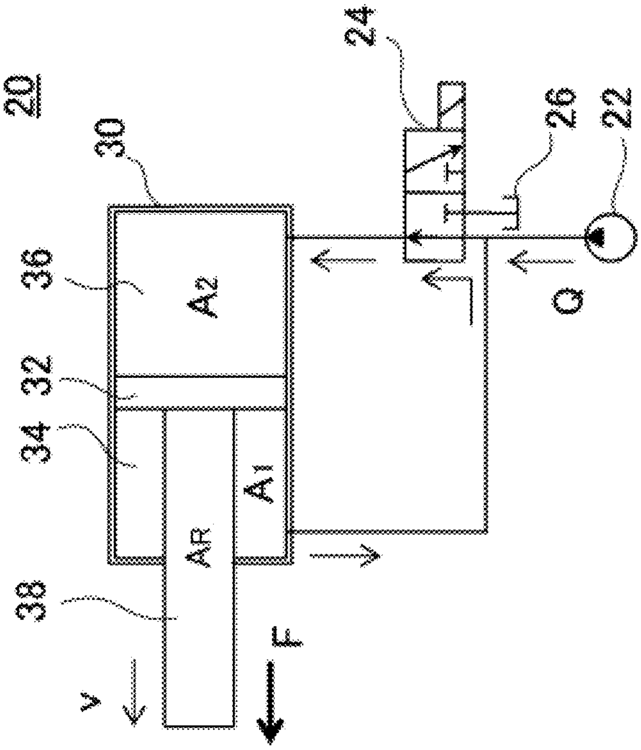
FIG. 3A and FIG. 3B are diagrams illustrating a differential circuit in a hydraulic system.
Figure 3A:
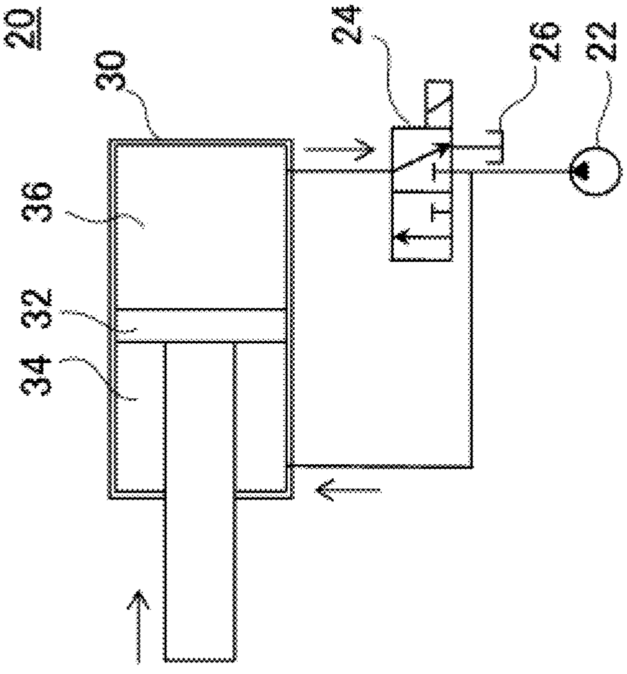

FIG. 3A and FIG. 3B are diagrams illustrating the differential circuit 20 in the hydraulic system. The differential circuit 20 includes a hydraulic cylinder 30, a pump 22, a control valve 24, and a tank 26. The configuration of the hydraulic cylinder 30 is the same as that of the pneumatic cylinder 10 of FIG. 2A and FIG. 2B, and the internal space of the cylinder is divided into a left oil chamber 34 and a right oil chamber 36 by a piston 32.

In the forward stroke shown in FIG. 3A, the oil from the pump 22 flows into the left oil chamber 34 of the cylinder, and the oil coming out of the right oil chamber 36 returns to the tank 26.

On the other hand, in the return stroke shown in FIG. 3B, the oil chambers 34 and 36 on both sides of the cylinder are pressurized with the same pressure. Here, the pressure receiving area $A_1$ of the left oil chamber 34 of the piston 32 is different from the pressure receiving area $A_2$ of the right oil chamber 36. In this example, the pressure receiving area $A_1$ of the left oil chamber 34 is smaller than the pressure receiving area $A_2$ of the right oil chamber 36 by the cross-sectional area $A_R$ of the piston rod 38.

That is, since the pressure receiving area of the oil chamber 36 on the right side is large, the force toward the left becomes large, and the piston rod 38 moves to the left. At this time, the oil coming out of the left oil chamber 34 and the oil from the pump 22 are combined and flow into the right oil chamber 36, so that the cylinder moves at high speed. As described above, the feature of the differential circuit 20 is that the return stroke can be moved at high speed, and the smaller the area difference $|A_2-A_1|$ on both sides of the cylinder, the faster the movement. Assuming that the cylinder speed is v, the following equation holds.

$$A_1v+Q=A_2v \tag{8}$$

Therefore, the cylinder speed v is expressed by the equation (9). Since the oil from the pump 22 is used only to fill the volume of the piston rod 38, the thinner the rod, the faster the cylinder speed v.

$$v = \frac{Q}{A_2 - A_1} = \frac{Q}{A_R} \quad (9)$$

On the other hand, the output is as shown in equation (10), and the thinner the piston rod 38 (the smaller the $A_R$), the smaller the output.

$$F=A_2p-A_1p=(A_2-A_1)p=A_Rp \quad (10)$$

In order to take advantage of such characteristics, the differential circuit 20 has been used for the return stroke when a large output is not required when the return is to be quick.

2.2 Application of Differential Circuit to Pneumatic System

Figure 4B:
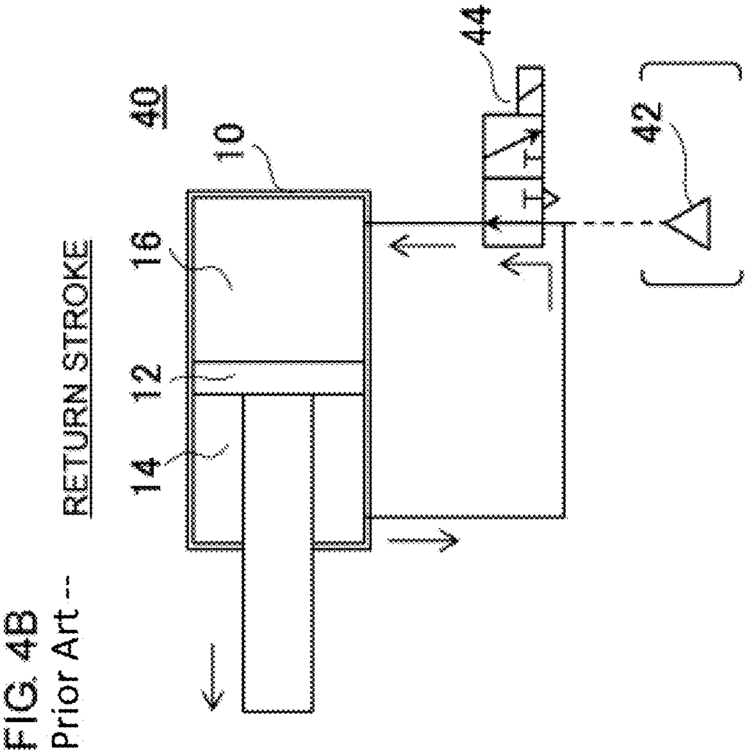
FIG. 4A and FIG. 4B are diagrams illustrating a differential circuit in a pneumatic system.
Figure 4A:
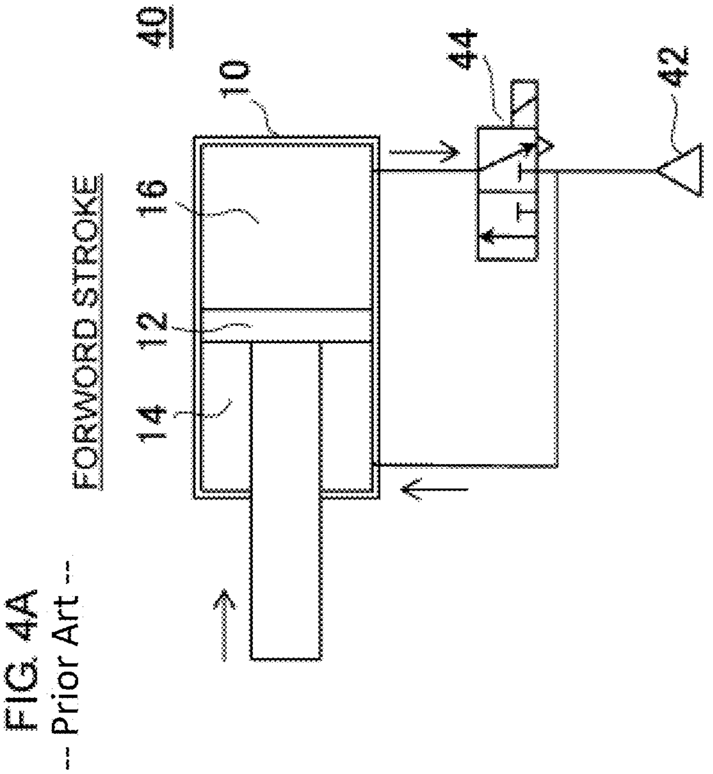

Next, the application of the differential circuit to the pneumatic system will be described. FIG. 4A and FIG. 4B are diagrams illustrating a differential circuit 40 in a pneumatic system. The differential circuit 40 includes a pneumatic cylinder 10, a pneumatic source (compressor) 42, and a control valve 44.

FIG. 4A shows the forward stroke, and its operation is the same as that of the differential circuit 20 in the hydraulic system.

FIG. 4B shows the return stroke. The present inventor focused on a major feature not found in hydraulic systems in the return stroke when applying the differential circuit used in hydraulic systems to pneumatic systems.

Specifically, when the differential circuit 40 is used in the pneumatic system, as shown in FIG. 4B, it can move without necessarily supplying air from the pneumatic source 42 in the return stroke. This is because, unlike oil, air expands. In FIG. 4B, since the passage connecting the left chamber 14 and the right chamber 16 of the cylinder is opened, the left chamber 14 and the right chamber 16 have the same pressure, but there is an area difference ($A_1<A_2$), so that the piston 12 moves to the left (return stroke).

Let L be the cylinder length and x be the length of the right chamber 16 of the piston 12. The volume V of the air chamber in the cylinder is expressed by the following equation, and the volume V increases as the piston 12 moves to the left, that is, as the length x increases.

$$V = A_1(L-x) + A_2x = (A_2 - A_1)x + A_1L$$

Assuming an isothermal change as a state change, PV=constant, so when the volume V increases with the movement of the piston 12, the pressure P gradually decreases. If the air pressure source 42 is connected as shown by the broken line in the figure, compressed air is supplied from the air pressure source 42, so that the pressure P does not decrease even if the piston 12 moves.

The above is the behavior of the differential circuit in the pneumatic system.

3. Pneumatic Actuator According to the Embodiment

Hereinafter, the pneumatic actuator according to the embodiment will be described in detail. This pneumatic cylinder utilizes the concept of the differential circuit described above in three stages. Thereby, the efficiency is improved by effectively utilizing all (or most of) the output of compressed air "while expanding from supply pressure to atmospheric pressure".

3.1 Basic Configuration

The pneumatic actuator according to the present embodiment is used by directly connecting two pneumatic cylinders having different pressure receiving areas on both sides of the piston and is also referred to as a double cylinder actuator below. The double cylinder actuator 100 has four pressure receiving surfaces, and the pressure receiving areas thereof are $A_1$ and $A_2$ on both sides of the first cylinder and $A_3$ and $A_4$ on both sides of the second cylinder. These areas are increased in order such that $A_1<A_2<A_3<A_4$.

Figure 5:
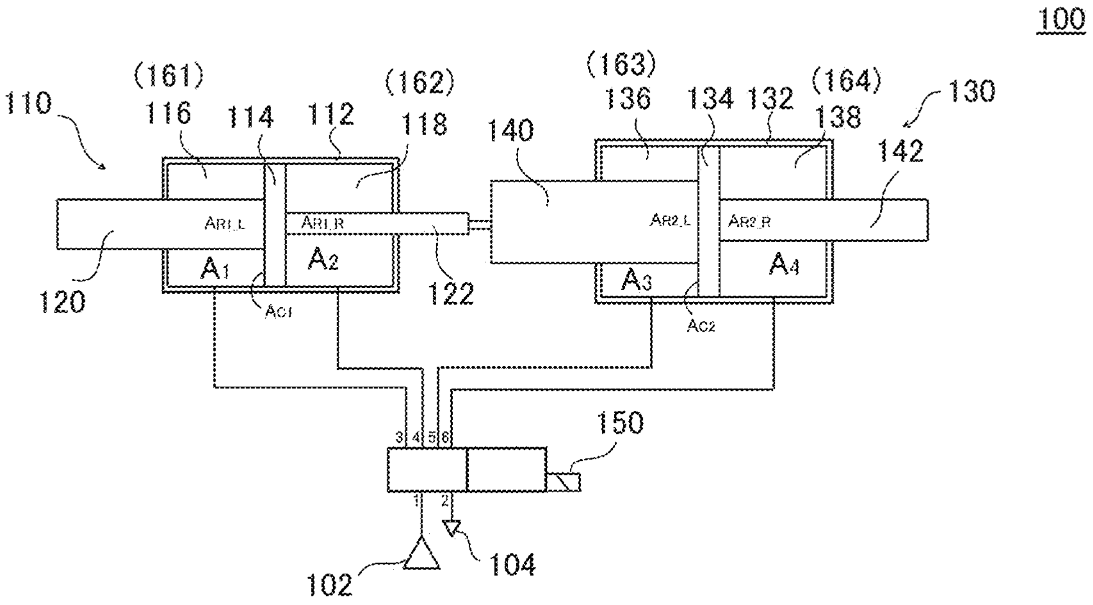
FIG. 5 is a diagram showing a double cylinder actuator according to an embodiment.

FIG. 5 is a diagram showing a double cylinder actuator 100 according to an embodiment. The double cylinder actuator 100 includes a first cylinder 110, a second cylinder 130 and a control valve 150. As the control valve 150, a solenoid valve can be used, but the present invention is not limited to this. In the figure, the right direction is the output direction in the going stroke of the double cylinder actuator 100, and the left direction is the output direction in the return stroke of the double cylinder actuator 100. It is assumed that the double cylinder actuator 100 repeatedly reciprocates many times.

The first cylinder 110 includes a first cylinder tube 112 and a first piston 114. The first piston 114 is displaceable in the first cylinder tube 112, and the space in the first cylinder tube 112 is partitioned by the first piston 114 into the left air chamber 116 and the right air chamber 118.

The pressure receiving area $A_1$ on the first surface (left air chamber 116 side) of the first piston 114 is smaller than the pressure receiving area $A_2$ on the second surface (right air chamber 118 side).

$$A_1<A_2$$

In the present embodiment, the first cylinder 110 is double-ended rod cylinders, the left rod 120 is installed on the left air chamber 116 side of the first piston 114, and the right rod 122 is installed on the right air chamber 118 side. When the cross-sectional area of the first cylinder tube 112 is $A_{C1}$, the cross-sectional area of the left rod 120 is $A_{R1\_L}$, and the cross-sectional area of the right rod 122 is $A_{R1\_R}$, the following relational expression holds.

$$A_1=A_{C1}-A_{R1\_L}$$

$$A_2=A_{C1}-A_{R1\_R}$$

$$\text{where, } A_{R1\_L}>A_{R1\_R}$$

The second cylinder 130 includes a second cylinder tube 132 and a second piston 134. The second piston 134 is displaceable in the second cylinder tube 132, and the space in the second cylinder tube 132 is partitioned by the second piston 134 into the left air chamber 136 and the right air chamber 138.

The first cylinder 110 and the second cylinder 130 are arranged so that the first piston 114 and the second piston 134 are parallel to each other. Further, the second piston 134 is connected so that the displacement is the same as that of the first piston 114. In FIG. 5, the second piston 134 and the first piston 114 are connected via the right rod 122 and the left rod 140.

The pressure receiving area $A_3$ on the first surface (left air chamber 136 side) of the second piston 134 is smaller than the pressure receiving area $A_4$ on the second surface (right air chamber 138 side).

$$A_3<A_4$$

In the present embodiment, the second cylinder 130 is also a double-ended rod cylinder, the left rod 140 is installed on the left air chamber 136 side of the second piston 134, and the right rod 142 is installed on the right air chamber 138 side. When the cross-sectional area of the second cylinder tube 132 is $A_{C2}$, the cross-sectional area of the left rod 140 is $A_{R2\_L}$, and the cross-sectional area of the right rod 142 is $A_{R2\_R}$, the following relational expression holds.

$$A_3=A_{C2}-A_{R2\_L}$$

$$A_4=A_{C2}-A_{R2\_R}$$

$$\text{where, } A_{R2\_L}>A_{R2\_R}$$

Further, in the present embodiment, the relationship of $A_2<A_3$ is satisfied. That is, $$A_1<A_2<A_3<A_4$$

The two air chambers 116, 118 of the first cylinder 110 and the two air chambers 136, 138 of the second cylinder 130 are referred to as a first air chamber, a second air chamber, a third air chamber, and a fourth air chamber in order from the one having the smallest pressure receiving area, and the reference numerals 161, 162, 163, and 164 will be newly added to these chambers. In this example, they are associated as follows:

first air chamber 161=left air chamber 116 of the first cylinder 110, second air chamber 162=right air chamber 118 of the first cylinder 110, third air chamber 163=left air chamber 136 of the second cylinder 130; and fourth air chamber 164=right air chamber 138 of the second cylinder 130.

A part or all of the rods of the first cylinder 110 and the second cylinder 130 are used as a design parameter of the pressure receiving area, and also serve as a coupling means for connecting the first piston 114 and the second piston 134.

In this example, the control valve 150 is shown as a 6-port 2-position valve. The first port (1) to the sixth port (6) are connected to the air pressure source 102, the atmosphere 104, and the first air chamber 161 to the fourth air chamber 164, respectively. The control valve 150 may be at least as long as the first position and the second position described below can be switched, and the number of positions is not limited to two. For example, when it is assumed that the piston stops at a position in the middle of the forward stroke, a directional control valve having a closed center function may be used. In this case, a 3-position valve may be used. Further, the method of holding and operating the control valve is not particularly limited, and a single solenoid type (spring return type), a double solenoid type, or another type of valve can be used.

In general, pneumatic cylinders include a "double-acting cylinder" that outputs both during the forward stroke and the return stroke, and a "single-acting cylinder" that outputs during the forward stroke but does not require output during the return stroke and returns by a spring or its own weight. Therefore, the double-cylinder actuator 100 according to the embodiment may also have a double-acting cylinder and a single-acting cylinder. The configuration of the control valve 150 differs depending on whether the double cylinder actuator 100 is a single-acting cylinder or a double-acting cylinder. Therefore, in the following, a double-acting cylinder and a single-acting cylinder will be described in this order.

(1) Double-Acting Cylinder (1-1) Forward Stroke

Figure 6:
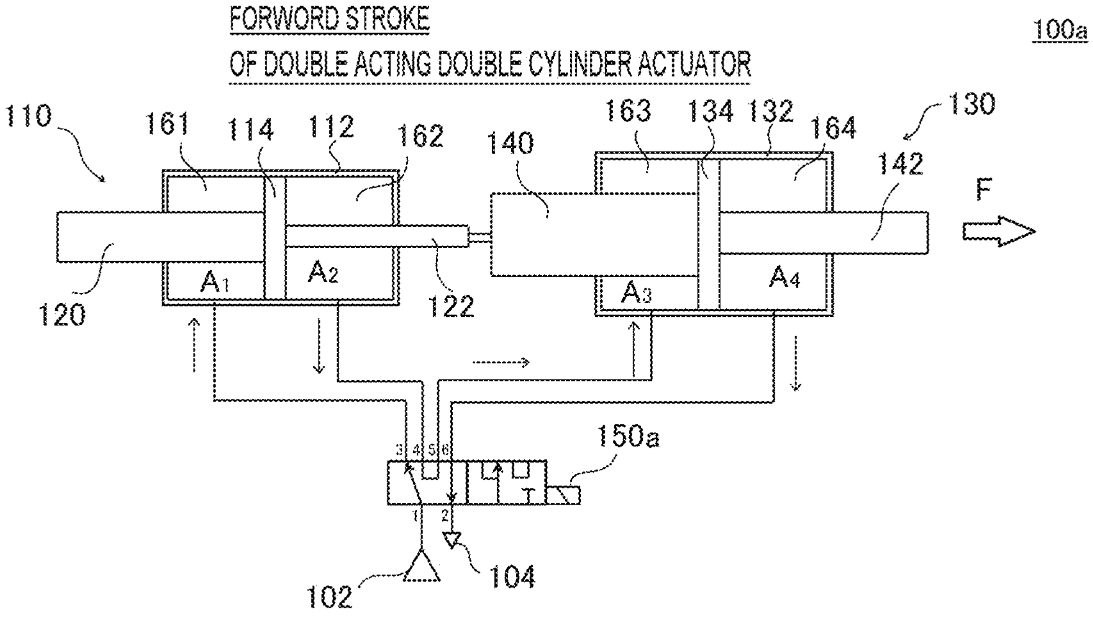
FIG. 6 is a diagram illustrating a forward stroke of a double-acting double cylinder actuator.

FIG. 6 is a diagram illustrating the forward stroke of the double-acting double cylinder actuator 100*a*. In the forward stroke, the control valve 150*a* connects the air pressure source 102 to the first air chamber 161, connects the second air chamber 162 and the third air chamber 163, and opens the fourth air chamber 164 to the atmosphere 104. Specifically, the control valve 150*a* is set in the first position, conducts from the first port (1) toward the third port (3), and conducts between the fourth port (4) and the fifth port (5), and conducts from the 6th port (6) toward the second port (2).

In the forward stroke (movement of rightward output), compressed air is supplied to the first air chamber 161 to obtain rightward output. Further, the second air chamber 162 and the third air chamber 163 are connected, but since $A_2<A_3$, a rightward output can be obtained by the same principle as the differential circuit. The resultant force F of these two rightward outputs is larger than that of a single cylinder 110 alone.

(1-2) Return Stroke

Figure 7:
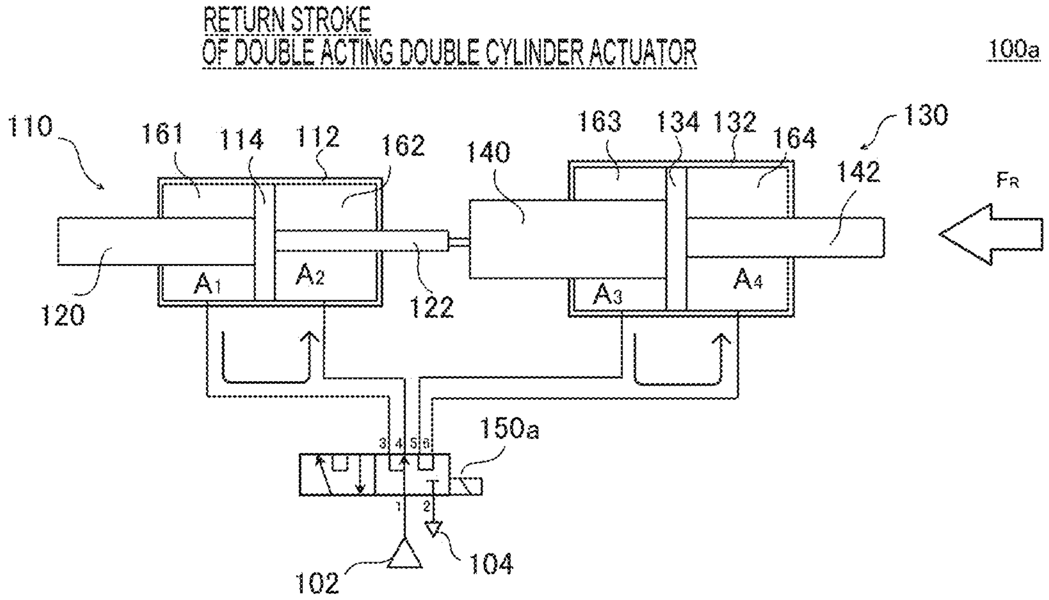
FIG. 7 is a diagram illustrating a return stroke of a double-acting double cylinder actuator.

FIG. 7 is a diagram illustrating a return stroke of the double-acting double cylinder actuator 100*a*. In the return stroke, the control valve 150*a* connects the first air chamber 161 and the second air chamber 162 to the air pressure source 102 and connects the third air chamber 163 and the fourth air chamber 164. Specifically, the control valve 150*a* is set in the second position, conducts from the first port (1) and the third port (3) toward the fourth port (4), and conducts between the fifth port (5) and the sixth port (6), and the second port (2) is closed.

In the return stroke (movement of the leftward output), compressed air is supplied to the second air chamber 162, and at the same time, the second air chamber 162 of the first cylinder 110 and the first air chamber 161 are connected. Since $A_1<A_2$, a leftward output can be obtained by the same principle as the differential circuit.

Further, the third air chamber 163 and the fourth air chamber 164 of the second cylinder 130 are connected, since $A_3<A_4$, a leftward output can be obtained by the same principle as the differential circuit. The resultant force $F_R$ of these two leftward outputs is larger than that of a single cylinder 110 alone.

As described above, in the double-acting cylinder, the outputs F and FR of the double-acting cylinder are larger than those of the single cylinder 110 at both the forward stroke and the return stroke. This is because the force of the expansion process of compressed air is also used.

For example, the pressure receiving area ratio of the double cylinder actuator 100 is assumed to be $A_1$:$A_2$:$A_3$:$A_4$=1:2:4:8. If the state change is an isothermal change, the pressure in each chamber is inversely proportional to the volume, and the supply pressure of the compressed air is usually 0.8 [MPa (abs)], so that the pressure in each air chamber changes as follows in each of the forward stroke and the return stroke.

Forward Stroke

First air chamber 161=0.8 MPa

Second air chamber 162=0.8→0.8×(2/4)=0.4 MPa

Third air chamber 163=0.8→0.8×(2/4)=0.4 MPa

Fourth air chamber 164=0.1 MPa (atmospheric pressure)

Return stroke

First air chamber 161=0.8 MPa

Second air chamber 162=0.8 MPa

Third air chamber 163=0.4→0.4×(4/8)=0.2 MPa

Fourth air chamber 164=0.4→0.4×(4/8)=0.2 MPa

In the final fourth air chamber 164, the pressure drops to about 0.2 MPa, and it can be seen that the force of the expansion process of the compressed air can be fully utilized up to near the atmospheric pressure as compared with the conventional actuator. Further, for example, if the output of the double cylinder actuator 100 is twice that of the case of only a single cylinder 110, the entire pressure receiving area of the double cylinder actuator 100 can be halved in order to obtain the same output. As a result, the amount of air consumed will be halved, and the efficiency approaches 100% from the current 50%.

When using only a single cylinder, sound is generated when compressed air is discharged into atmospheric pressure. In order to reduce this sound, a silencer is often inserted. When the double cylinder actuator 100 is used, the air whose pressure has dropped to the vicinity of the atmospheric pressure is exhausted, so that it is possible to omit the silencer, thereby reducing the cost.

(2) Single-Acting Cylinder (2-1) Forward Stroke

The forward stroke of the single-acting cylinder is the same as the forward stroke of the double-acting cylinder, and is as described with reference to FIG. 6, so the description thereof will be omitted.

(2-2) Return Stroke

Figure 8:
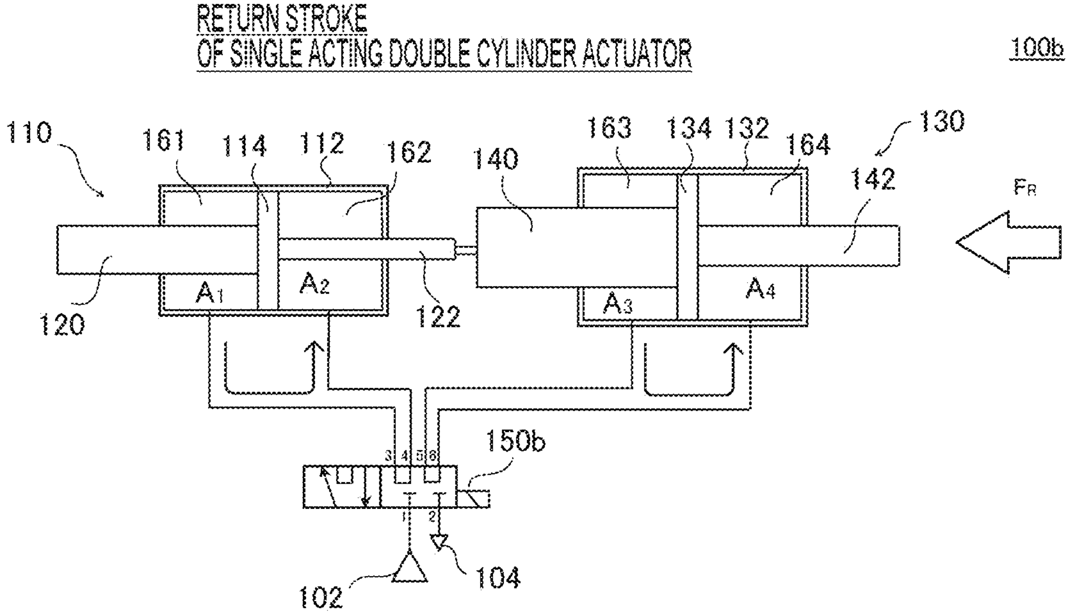
FIG. 8 is a diagram illustrating a return stroke of a single-acting double cylinder actuator.

FIG. 8 is a diagram illustrating a return stroke of the single-acting double cylinder actuator 100*b*. In the single-acting double cylinder actuator 100$b$, the function of the control valve 150$b$ in the return stroke is different from that of the control valve 150$a$ of the double-acting double cylinder actuator 100$a$. The control valve 150$b$ connects the first air chamber 161 and the second air chamber 162 in a state of being separated from the air pressure source 102 in the return stroke and connects the third air chamber 163 and the fourth air chamber 164. Specifically, the control valve 150$b$ is set to the second position, the first port (1) and the second port (2) are closed, conducts between the third port (3) and the fourth port (4), and conducts between the fifth port (5) and the sixth port (6).

In the single-acting cylinder, the output is not always required in the return stroke (movement of the leftward output), so the compressed air from the pneumatic source 102 is not supplied to the second air chamber 162. Therefore, compressed air is not consumed during the return stroke. However, since the pair of the first air chamber 161 and the second air chamber 162 and the pair of the third air chamber 163 and the fourth air chamber 164 each form a differential circuit, a certain amount of output can be obtained even during the return stroke.

In the single-acting cylinder, the pressure receiving area ratio of the double cylinder actuator 100 is assumed to be set to $A_1$:$A_2$:$A_3$:$A_4$=1:2:4:8, and the supply pressure of the compressed air is assumed to be set to 0.8 [MPa (abs)]. At that time, the pressure in each air chamber changes as follows in each of the forward stroke and the return stroke.

Forward Stroke
First air chamber 161=0.8 MPa
Second air chamber 162=0.4→0.4×(2/4)=0.2 MPa
Third air chamber 163=0.4→0.4×(2/4)=0.2 MPa
Fourth air chamber 164=0.1 MPa (atmospheric pressure)
Return stroke
First air chamber 161=0.8→0.8×(1/2)=0.4 MPa
Second air chamber 162=0.8→0.8×(1/2)=0.4 MPa
Third air chamber 163=0.2→0.2×(4/8)=0.1 MPa
Fourth air chamber 164=0.2→0.2×(4/8)=0.1 MPa (atmospheric pressure)

In the final fourth air chamber 164, the pressure dropped to 0.1 MPa, which is an atmospheric pressure, and it can be seen that the energy can be used more effectively than the double-acting cylinder.

4. Output Characteristics of Double Cylinder Actuator 100

Next, the output characteristics of the double cylinder actuator 100 will be described for each of the double-acting cylinder and the single-acting cylinder.

(1) Double Acting Cylinder (1-1) Output During the Forward Stroke

Figure 9:
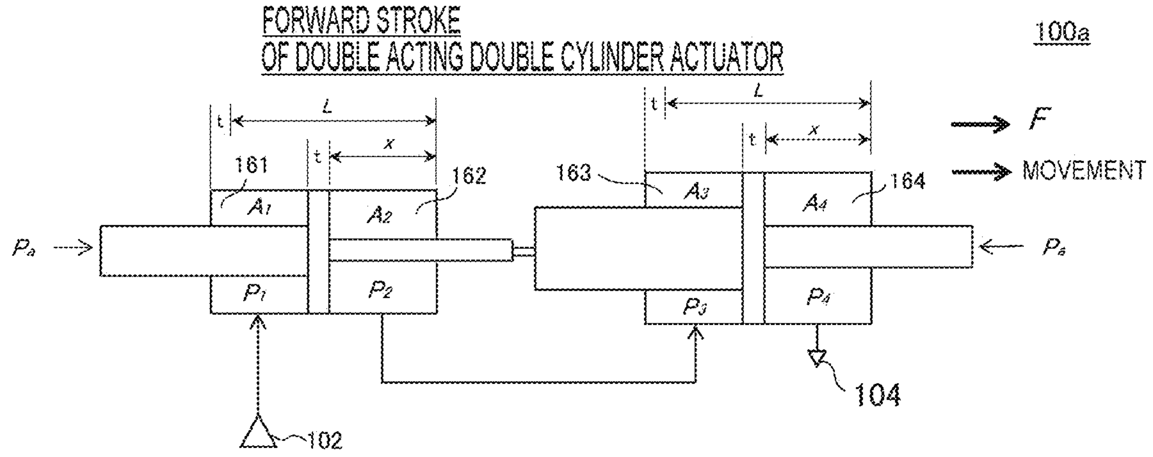
FIG. 9 is a diagram illustrating the output characteristics of a forward stroke of the double-acting double cylinder actuator.

FIG. 9 is a diagram illustrating the output characteristics of in the forward stroke of the double-acting double cylinder actuator 100$a$. Let L be the length of the first cylinder 110 and the second cylinder 130, and x be the position of the first piston 114 and the second piston 134. In the forward stroke, x=L is the initial state and x=0 is the final state. In the figure, t indicates the thickness of the piston.

The pressures of the first air chamber 161, the second air chamber 162, the third air chamber 163, and the fourth air chamber 164 are referred to as $P_1$, $P_2$, $P_3$, and $P_4$.

In FIG. 9, when the rightward output is defined as F, the equation (11) holds because $P_2$=$P_3$.

$$\begin{aligned} F &= \{A_1P_1 - A_2P_2 + (A_2 - A_1)P_a\} + \\ &\quad \{A_3P_3 - A_4P_4 + (A_4 - A_3)P_a\} \\ &= A_1P_1 + (A_3 - A_2)P_2 - A_4P_4 + (A_2 + A_4 - A_1 - A_3)P_a \end{aligned} \tag{11}$$

In the initial state x=L, $P_2$=Ps, which is the final state of the immediately preceding return stroke. Afterwards, pressure changes from $P_2$=$P_3$=Ps toward $P_2$=$P_3$=($A_2$/$A_3$)Ps. Further, since $P_1$=Ps and $P_4$=Pa (atmospheric pressure) remain, the output in the initial state is represented by the equation (12), and the output in the final state is represented by the equation (13).

$$\begin{aligned} F &= A_1P_1 + (A_3 - A_2)P_2 - A_4P_4 + (A_2 + A_4 - A_1 - A_3)P_a \\ &= A_1P_s + (A_3 - A_2)P_s - A_4P_a + (A_2 + A_4 - A_1 - A_3)P_a \\ &= \left\{\left(1 + \frac{A_3}{A_1} - \frac{A_2}{A_1}\right) + \left(\frac{A_2 - A_1 - A_3}{A_1}\right)\left(\frac{P_a}{P_s}\right)\right\}A_1P_s \end{aligned} \tag{12}$$

$$\begin{aligned} F &= A_1P_1 + (A_3 - A_2)P_2 - A_4P_4 + (A_2 + A_4 - A_1 - A_3)P_a \\ &= A_1P_s + (A_3 - A_2)(A_2/A_3)P_s - A_4P_a + \\ &\quad (A_2 + A_4 - A_1 - A_3)P_a \\ &= \left\{\left(1 + \frac{A_2}{A_1}\left(1 - \frac{A_2}{A_3}\right)\right) + \left(\frac{A_2 - A_1 - A_3}{A_1}\right)\left(\frac{P_a}{P_s}\right)\right\}A_1P_s \end{aligned} \tag{13}$$

(1-2) Output During the Return Stroke

Figure 10:
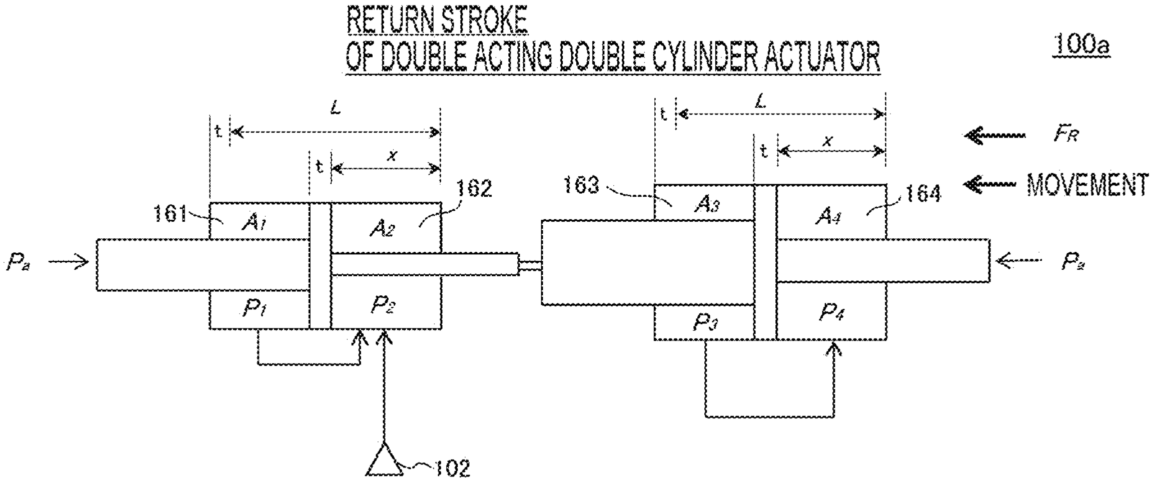
FIG. 10 is a diagram illustrating the output characteristics of the return stroke of the double-acting double cylinder actuator.

FIG. 10 is a diagram illustrating the output characteristics in the return stroke of the double-acting double cylinder actuator 100$a$. In the return stroke, x=0 is the initial state and x=L is the final state.

In FIG. 10, when the leftward output is defined as $F_R$, the equation (14) holds because $P_1$=$P_2$ and $P_3$=$P_4$.

$$\begin{aligned} F_R &= \{A_2P_2 - A_1P_1 - (A_2 - A_1)P_a\} + \\ &\quad \{A_4P_4 - A_3P_3 - (A_4 - A_3)P_a\} \\ &= (A_2 - A_1)P_1 + (A_4 - A_3)P_3 - (A_2 + A_4 - A_1 - A_3)P_a \end{aligned} \tag{14}$$

In this case, the pair of the first air chamber 161 and the second air chamber 162, the pair of the third air chamber 163 and the fourth air chamber 164 are connected to each other. Further, compressed air from air pressure source 102 is supplied to the second air chamber 162. In the initial state x=0, pressure of the third chamber is $P_3$=($A_2$/$A_3$) Ps, which is the final state of the immediately preceding stroke. Then, as x→L, it changes from $P_3$=($A_2$/$A_3$) Ps to $P_3$=$P_4$=($A_2$/$A_3$) Ps×($A_3$/$A_4$)=($A_2$/$A_4$)Ps. The pressures of first air chamber 161 and the second air chamber 162 remain $P_1$=$P_2$=Ps. Therefore, the output in the initial state is expressed by the equation (15), and the output in the final state is expressed by the equation (16).

$$\begin{aligned} F_R &= (A_2 - A_1)P_1 + (A_4 - A_3)P_3 - (A_2 + A_4 - A_1 - A_3)P_a \\ &= (A_2 - A_1)P_s + (A_4 - A_3)(A_2/A_3)P_s - \\ &\quad (A_2 + A_4 - A_1 - A_3)P_a \\ &= \left\{\left(\frac{A_4}{A_3}\right)\left(\frac{A_2}{A_1}\right) - 1 - \left(\frac{A_2 + A_4 - A_1 - A_3}{A_1}\right)\left(\frac{P_a}{P_s}\right)\right\}A_1P_s \end{aligned} \tag{15}$$

$$\begin{aligned} F_R &= (A_2 - A_1)P_1 + (A_4 - A_3)P_3 - \\ &\quad (A_2 + A_4 - A_1 - A_3)P_a \\ &= (A_2 - A_1)P_s + (A_4 - A_3)(A_2/A_4)P_s - \\ &\quad (A_2 + A_4 - A_1 - A_3)P_a \\ &= \left\{2\left(\frac{A_2}{A_1}\right) - 1 - \left(\frac{A_3}{A_4}\right)\left(\frac{A_2}{A_1}\right) - \right. \\ &\quad \left.\left(\frac{A_2 + A_4 - A_1 - A_3}{A_1}\right)\left(\frac{P_a}{P_s}\right)\right\}A_1P_s \end{aligned} \tag{16}$$

Here, as an example, let's find the F and $F_R$ of the double acting cylinder in the case of $A_2/A_1=A_3/A_2=A_4/A_3=2$. This is the case of $A_4=2A_3=4A_2=8A_1$. The supply pressure of the compressed air is Ps=0.8 MPa (abs). That is, Ps=8 Pa.

The output F in the initial state and the final state at the time of the forward stroke is as follows.

$$x=L\ F=\left\{\left(1+\frac{A_3}{A_1}-\frac{A_2}{A_1}\right)+\left(\frac{A_2-A_1-A_3}{A_1}\right)\left(\frac{P_a}{P_s}\right)\right\}A_1P_s=\left\{(1+4-2)+\left(\frac{2-1-4}{1}\right)\left(\frac{1}{8}\right)\right\}A_1P_s=\frac{21}{8}A_1P_s$$
$$\downarrow$$
$$x=0\ F=\left\{\left(1+\frac{A_2}{A_1}\left(1-\frac{A_2}{A_3}\right)\right)+\left(\frac{A_2-A_1-A_3}{A_1}\right)\left(\frac{P_a}{P_s}\right)\right\}A_1P_s=\left\{1+2\left(1-\frac{1}{2}\right)+\left(\frac{2-1-4}{1}\right)\left(\frac{1}{8}\right)\right\}A_1P_s=\frac{13}{8}A_1P_s$$

Also, the output $F_R$ in the initial state and the final state at the time of the return stroke is as follows.

$$x=0\ F_R=\left\{\left(\frac{A_4}{A_3}\right)\left(\frac{A_2}{A_1}\right)-1-\left(\frac{A_2+A_4-A_1-A_3}{A_1}\right)\left(\frac{P_a}{P_s}\right)\right\}A_1P_s=\left\{2\times2-1-\left(\frac{2+8-1-4}{1}\right)\left(\frac{1}{8}\right)\right\}A_1P_s=\frac{19}{8}A_1P_s$$
$$\downarrow$$
$$x=L\ F_R=\left\{2\left(\frac{A_2}{A_1}\right)-1-\left(\frac{A_3}{A_4}\right)\left(\frac{A_2}{A_1}\right)-\left(\frac{A_2+A_4-A_1-A_3}{A_1}\right)\left(\frac{P_a}{P_s}\right)\right\}A_1P_s=\left\{2\times2-1-\left(\frac{1}{2}\right)\times2-\left(\frac{2+8-1-4}{1}\right)\left(\frac{1}{8}\right)\right\}A_1P_s=\frac{11}{8}A_1P_s$$

In each case, the output at the start of movement is considerably larger than twice the output of $A_1$Ps, which is the output of the single cylinder 110, but the output at the end of movement is less than twice. This is often fine, as it is important for the cylinder to start moving. Rather, the smaller output F, $F_R$ in the final state can be regarded as a pseudo cushion at the forward stroke end, which is preferable in some applications.

If the decrease in output in the final state becomes a problem, it is necessary to smooth the output in the initial state and the output in the final state. This method will be described later.

(2) Single-Acting Cylinder

What is explained here is the output of the single-acting double cylinder actuator 100*b*. A single-acting cylinder outputs a force during the forward stroke but is not required to output a force during the returning stroke and returns by a spring or its own weight.

(2-1) Output During the Forward Stroke

Figure 11:
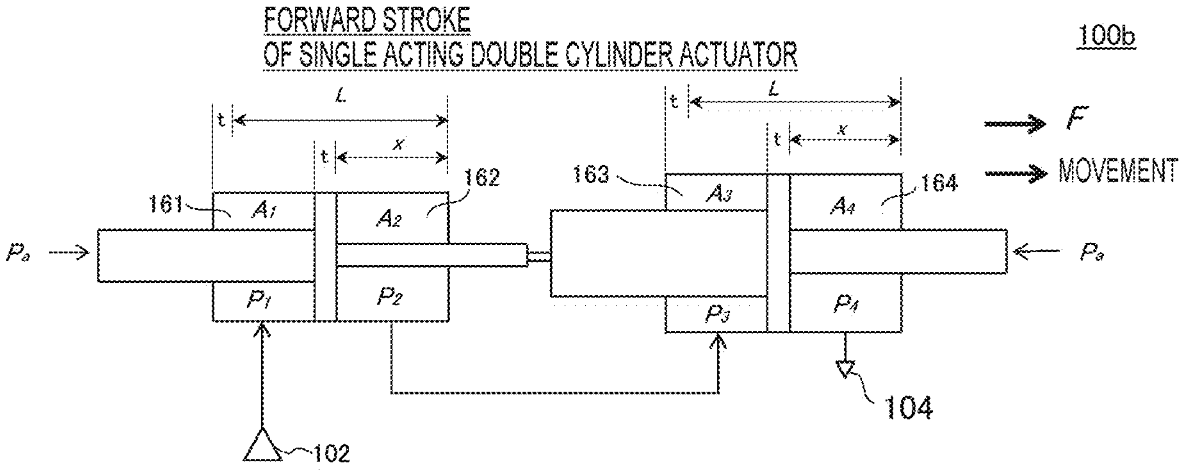
FIG. 11 is a diagram illustrating the output characteristics of the forward stroke of the single-acting double cylinder actuator.

FIG. 11 is a diagram illustrating the output characteristics in the forward stroke of the single-acting double cylinder actuator 100*b*. In the forward stroke, x=L is the initial state and x=0 is the final state.

In FIG. 11, when the rightward output is defined as F, the following equation holds because $P_2=P_3$.

$$\begin{aligned}F&=\{A_1P_1-A_2P_2+(A_2-A_1)P_a\}+\\&\quad\{A_3P_3-A_4P_4+(A_4-A_3)P_a\}\\&=A_1P_1+(A_3-A_2)P_2-A_4P_4+\\&\quad(A_2+A_4-A_1-A_3)P_a\end{aligned}\tag{11}$$

In this case, in the initial state x=L, pressure of the second chamber is $P_2=(A_1/A_2)$ Ps, which is the final state of the immediately preceding return stroke. Then, as $x\to0$, it changes from $P_2=P_3=(A_1/A_2)$Ps to $P_2=P_3=(A_1/A_2)$Ps$\times(A_2/A_3)=(A_1/A_3)$ Ps. Further, since the pressures of first air chamber and the fourth air chamber remain $P_1$=Ps and $P_4$=Pa (atmospheric pressure), the output F in each of the initial state and the final state is expressed by the equations (17) and (18).

$$x=L\tag{17}$$

$$\begin{aligned}F&=A_1P_1+(A_3-A_2)P_2-A_4P_4+\\&\quad(A_2+A_4-A_1-A_3)P_a\\&=A_1P_s+(A_3-A_2)(A_1/A_2)P_s-A_4P_a+\\&\quad(A_2+A_4-A_1-A_3)P_a\\&=\left\{\left(\frac{A_3}{A_2}\right)+\left(\frac{A_2-A_1-A_3}{A_1}\right)\left(\frac{P_a}{P_s}\right)\right\}A_1P_s\end{aligned}$$

$$x=0\tag{18}$$

$$\begin{aligned}F&=A_1P_1+(A_3-A_2)P_2-A_4P_4+\\&\quad(A_2+A_4-A_1-A_3)P_a\\&=A_1P_s+(A_3-A_2)(A_1/A_3)P_s-A_4P_a+\\&\quad(A_2+A_4-A_1-A_3)P_a\\&=\left\{\left(2-\frac{A_2}{A_3}\right)+\left(\frac{A_2-A_1-A_3}{A_1}\right)\left(\frac{P_a}{P_s}\right)\right\}A_1P_s\end{aligned}$$

(2-2) Output During the Return Stroke

Figure 12:
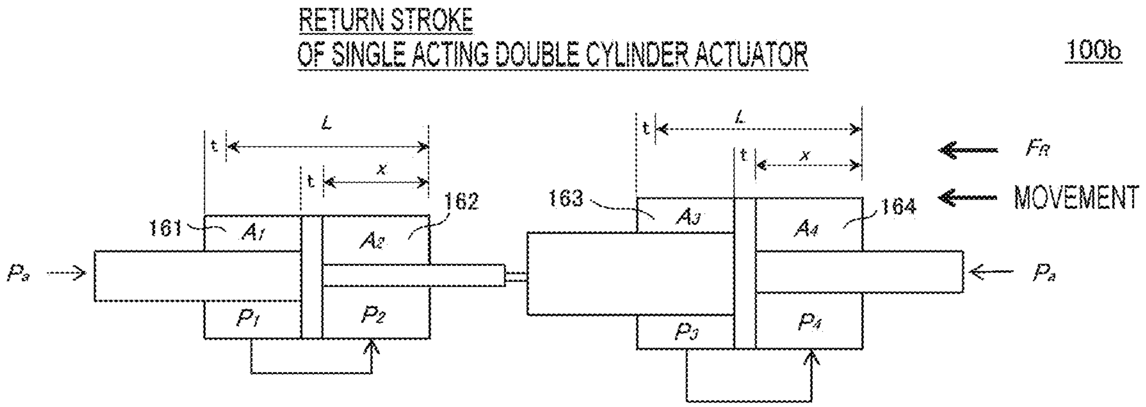
FIG. 12 is a diagram illustrating the output characteristics of the return stroke of the single-acting double cylinder actuator.

FIG. 12 is a diagram illustrating the output characteristics in the return stroke of the single-acting double cylinder actuator 100*b*. In the return stroke, x=0 is the initial state and x=L is the final state.

In FIG. 12, when the leftward output is defined as $F_R$, the equation (14) holds because $P_1=P_2$ and $P_3=P_4$.

$$\begin{aligned}F_R&=\{A_2P_2-A_1P_1-(A_2-A_1)P_a\}+\\&\quad\{A_4P_4-A_3P_3-(A_4-A_3)P_a\}\\&=(A_2-A_1)P_1+(A_4-A_3)P_3-\\&\quad(A_2+A_4-A_1-A_3)P_a\end{aligned}\tag{14}$$

In this case, the pair of the first air chamber 161 and the second air chamber 162 and the pair of the third air chamber 163 and the fourth air chamber 164 are connected, respectively. In the initial state x=0, $P_3=P_4=(A_1/A_3)$ Ps, which is the final state of the immediately preceding stroke, and $P_1=P_2$=Ps. As $x\to$L, it changes from $P_1=P_2$=Ps to $P_1=P_2=(A_1/A_2)$ Ps, and from $P_3=P_4=(A_1/A_3)$ Ps to $P_3=P_4=(A_1/A_3)$ Ps$\times(A_3/A_4)=(A_1/A_4)$Ps. Therefore, the output $F_R$ in each of the initial state and the final state in the return stroke is expressed by the equations (19) and (20).

$$
\begin{aligned}
F_R &= (A_2 - A_1)P_1 + (A_4 - A_3)P_3 - \\
&\quad (A_2 + A_4 - A_1 - A_3)P_a \\
&= (A_2 - A_1)P_s + (A_4 - A_3)(A_1/A_3)P_s - \\
&\quad (A_2 + A_4 - A_1 - A_3)P_a \\
&= \left\{\left(\frac{A_2}{A_1} + \frac{A_4}{A_3} - 2\right) - \left(\frac{A_2 + A_4 - A_1 - A_3}{A_1}\right)\left(\frac{P_a}{P_s}\right)\right\}A_1P_s
\end{aligned} \tag{19}
$$

$$
\begin{aligned}
F_R &= (A_2 - A_1)P_1 + (A_4 - A_3)P_3 - \\
&\quad (A_2 + A_4 - A_1 - A_3)P_a \\
&= (A_2 - A_1)(A_1/A_2)P_s + (A_4 - A_3)(A_1/A_4)P_s - \\
&\quad (A_2 + A_4 - A_1 - A_3)P_a \\
&= \left\{\left(2 - \frac{A_1}{A_2} - \frac{A_3}{A_4}\right) - \left(\frac{A_2 + A_4 - A_1 - A_3}{A_1}\right)\left(\frac{P_a}{P_s}\right)\right\}A_1P_s
\end{aligned} \tag{20}
$$

Here, as an example, let's find the F and $F_R$ of the single-acting cylinder in the case of $A_2/A_1=A_3/A_2=A_4/A_3=2$. This is the case of $A_4=2A_3=4A_2=8A_1$. The supply pressure of the compressed air is Ps=0.8 MPa (abs). That is, Ps=8 Pa.

The output F in each of the initial state and the final state in the forward stroke is as follows.

$$
\begin{aligned}
&x = L\ F = \left\{\left(\frac{A_3}{A_2}\right) + \left(\frac{A_2 - A_1 - A_3}{A_1}\right)\left(\frac{P_a}{P_s}\right)\right\}A_1P_s = \left\{2 + \left(\frac{2+8-1-4}{1}\right)\left(\frac{1}{8}\right)\right\}A_1P_s = \frac{13}{8}A_1P_s \\
&\downarrow \\
&x = 0\ F = \left\{\left(2 - \frac{A_2}{A_3}\right) + \left(\frac{A_2 - A_1 - A_3}{A_1}\right)\left(\frac{P_a}{P_s}\right)\right\}A_1P_s = \left\{\left(2 - \frac{1}{2}\right) + \left(\frac{2+8-1-4}{1}\right)\left(\frac{1}{8}\right)\right\}A_1P_s = \frac{9}{8}A_1P_s
\end{aligned}
$$

$$
\begin{aligned}
&x = 0\ F_R = \left\{\left(\frac{A_2}{A_1} + \frac{A_4}{A_3} - 2\right) - \left(\frac{A_2 + A_4 - A_1 - A_3}{A_1}\right)\left(\frac{P_a}{P_s}\right)\right\}A_1P_s = \left\{(2+2-2) - \left(\frac{2+8-1-4}{1}\right)\left(\frac{1}{8}\right)\right\}A_1P_s = \frac{11}{8}A_1P_s \\
&\downarrow \\
&x = L\ F_R = \left\{\left(2 - \frac{A_1}{A_2} - \frac{A_3}{A_4}\right) - \left(\frac{A_2 + A_4 - A_1 - A_3}{A_1}\right)\left(\frac{P_a}{P_s}\right)\right\}A_1P_s = \left\{\left(2 - \frac{1}{2} - \frac{1}{2}\right) - \left(\frac{2+8-1-4}{1}\right)\left(\frac{1}{8}\right)\right\}A_1P_s = \frac{3}{8}A_1P_s
\end{aligned}
$$

In a single-acting cylinder, only the output F in the forward stroke is important. The output in the initial state of the forward stroke is larger than the output of a single cylinder, but it is not doubled, and in the final state, it is not much different from that of a single cylinder. This is because compressed air is not supplied during the return stroke.

5. Optimization of Cylinder Pressure Receiving Area (1) Explanation of Design Parameters Here, we will consider the pressure receiving area ratio of the cylinder. Therefore, the pressure receiving area ratio is set as follows.

$A_2/A_1=\alpha$ $A_3/A_2=\beta$ $A_4/A_3=\gamma$

As it is, there are 3 parameters, so it is difficult to consider. Therefore, here, we will proceed with the study with $\alpha=\gamma$ as a constraint condition. This is because $\alpha$ and $\gamma$ have an area ratio on both sides of the same cylinder. Therefore, it becomes as follows.

$A_2/A_1=\alpha$ $A_3/A_2=\beta$ $A_4/A_3=\alpha$

Further, since the supply pressure of the compressed air is Ps=0.8 MPa (abs) and Ps=8 Pa, the product of the area ratio is set to 8 in order to utilize all the force generated when compressed air expands to the atmospheric pressure. That is, the constraint below is added.

$\alpha^2 \cdot \beta=8$ (2) Relationship Between the Output of the Double-Acting Cylinder and the Pressure Receiving Area Ratio The output F in the forward stroke is obtained by substituting the above design parameters into the equations (12) and (13) and is expressed as follows.

$$
\begin{aligned}
&x = L\ F = \left\{(1 + \alpha\beta - \alpha) + \left(\frac{\alpha - 1 - \alpha\beta}{8}\right)\right\}A_1P_s \\
&\downarrow \\
&x = 0\ F = \left\{1 + \alpha\left(1 - \frac{1}{\beta}\right) + \left(\frac{\alpha - 1 - \alpha\beta}{8}\right)\right\}A_1P_s
\end{aligned}
$$

The output $F_R$ in the return stroke is obtained by substituting the above design parameters into the equations (15) and (16) and is expressed as follows.

$$
\begin{aligned}
&x = 0\ F_R = \left\{(\alpha^2 - 1) - \left(\frac{\alpha + \alpha^2\beta - 1 - \alpha\beta}{8}\right)\right\}A_1P_s \\
&\downarrow \\
&x = L\ F_R = \left\{2\alpha - 2 - \left(\frac{\alpha + \alpha^2\beta - 1 - \alpha\beta}{8}\right)\right\}A_1P_s
\end{aligned}
$$

Figure 13:
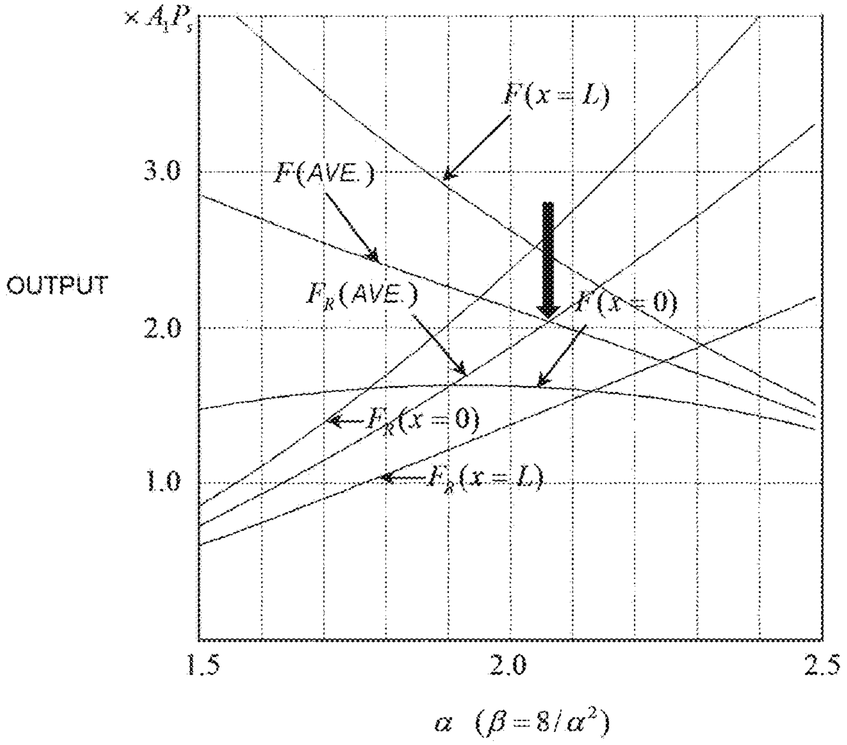

FIG. 13 is a diagram showing the relationship between the output magnification of the double-acting double cylinder actuator 100 and $\alpha$. In the forward stroke ($x=L\rightarrow 0$), the output changes from the line of F (x=L) toward the line of F (x=0). In the return stroke (x=0 L), the output $F_R$ changes from the line of $F_R$ (x=0) to the line of $F_R$ (x=L).

The average of both outputs during that period is larger than 2 in the vicinity indicated by the thick arrow in the figure.

$F_{(AVE)}=(2.04)A_1P_S, F_{R(AVE)}=(2.04)A_1P_S$ for $\alpha=2.06$, $\beta=1.89$ In this case, the average value of the outputs F and $F_R$ is about twice that of the output $A_1P_S$ of a single cylinder during both the forward stroke and the return stroke.

(3) Relationship Between the Output of the Single-Acting Cylinder and the Pressure Receiving Area Ratio The output F in the forward stroke is obtained by substituting the above design parameters into the equations (17) and (18) and is expressed as follows.

$$x = L\ F = \left\{\beta + \left(\frac{\alpha - 1 - \alpha\beta}{8}\right)\right\}A_1P_s$$
$$\downarrow$$
$$x = 0\ F = \left\{\left(2 - \frac{1}{\beta}\right) + \left(\frac{\alpha - 1 - \alpha\beta}{8}\right)\right\}A_1P_s$$

The output $F_R$ in the return stroke is obtained by substituting the above design parameters into the equations (19) and (20) and is expressed as follows.

$$x = 0\ F_R = 2(\alpha - 1)\left(1 - \frac{1 + \alpha\beta}{16}\right)A_1P_s$$
$$\downarrow$$
$$x = L\ F_R = 2(\alpha - 1)\left(\frac{1}{\alpha} - \frac{1 + \alpha\beta}{16}\right)A_1P_s$$

Figure 14:
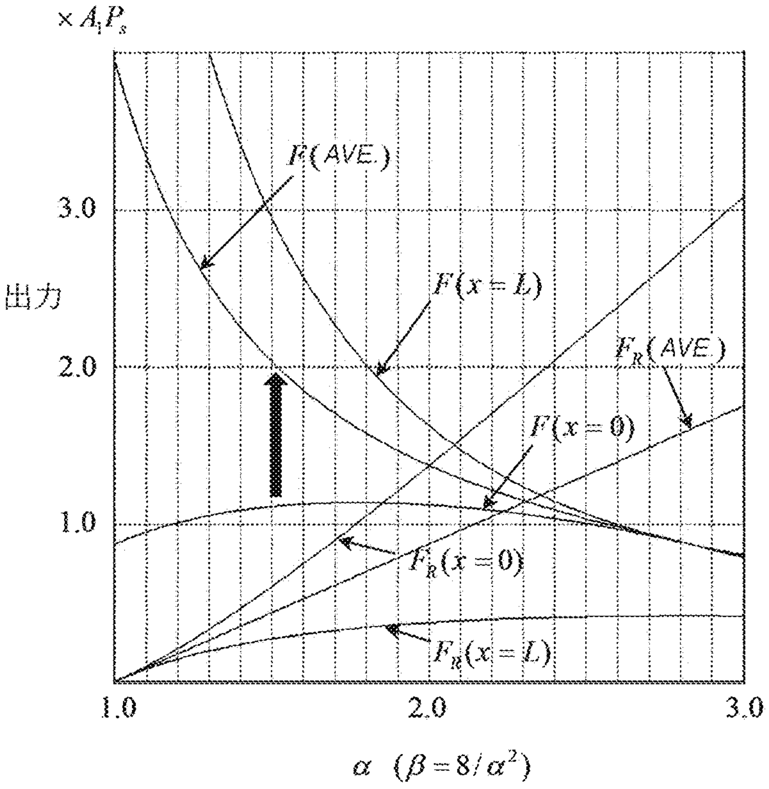

FIG. 14 is a diagram showing the relationship between the output magnification of the single-acting double cylinder actuator 100 and α. In the forward stroke (x=L→0), the output changes from the line of F (x=L) toward the line of F (x=0). In the return stroke (x=0 L), the output $F_R$ changes from the line of $F_R$ (x=0) to the line of $F_R$ (x=L).

The average output during the forward stroke is larger than 2, and the latter half of the operation is also relatively large in the vicinity indicated by the thick arrow in the figure.

$F_{(AVE)}=(2.0)A_1P_S, F_RR_{(max)}=(0.45)A_1P_S$ for α=1.51, β=3.51.

In this case, the average value $F_{(AVE)}$ of the output F in the forward stroke is more than twice the output $A_1P_S$ of a single cylinder. On the other hand, although the output during the return stroke is not required, it is possible to obtain an output close to half of the output of a single cylinder.

6. Smoothing the Output of the Double Cylinder Actuator 100

As described above, in the double cylinder actuator 100, when the displacement of the cylinder becomes large, the pressure inside the cylinder decreases, so that the output becomes small. In applications where this is not desirable, "negative spring properties" may be introduced to smooth the output.

Figure 15:
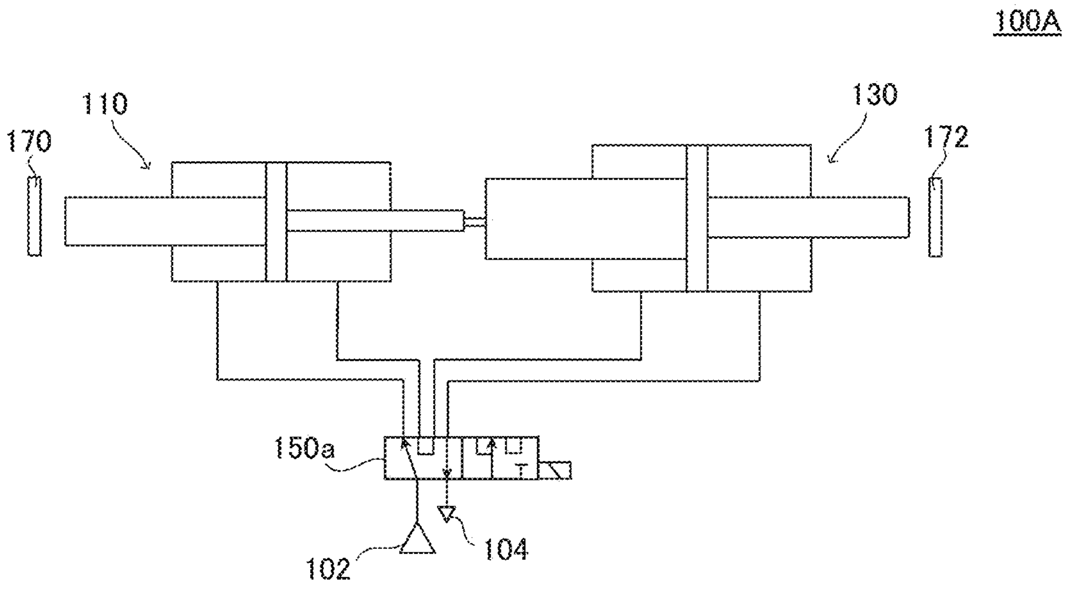
FIG. 15 is a diagram showing a double cylinder actuator whose output is smoothed.

FIG. 15 is a diagram showing a double cylinder actuator 100A having a smoothed output. The double cylinder actuator 100A includes magnets 170 and 172 provided near the forward stroke end, that is, near x=L and x=0. The magnets 170,172 provide properties similar to negative spring properties. Specifically, the output decreases as the pistons 114 and 134 approach the forward stroke end, and the attractive force of the magnets 170 and 172 compensates for the decrease. At the start of the forward stroke, the outputs F and $F_R$ of the cylinder are weakened by the attractive force of the magnet. In this way, the outputs F and $F_R$ in the initial state and the final state can be smoothed to some extent.

The means for introducing the negative spring characteristic is not limited to the one using a magnet, and for example, a method such as attaching a two-position stable spring to the piston can be considered.

In the case of a single-acting cylinder, the magnet 170 is not required and only the magnet 172 may be used.

The present disclosure has been described above based on the embodiment. This embodiment is an example, and various modifications can be made to the combination of each component and each process. It is also understood by vendors that such modifications are also within the scope of this disclosure. Hereinafter, such a modification will be described.

Figure 16A:
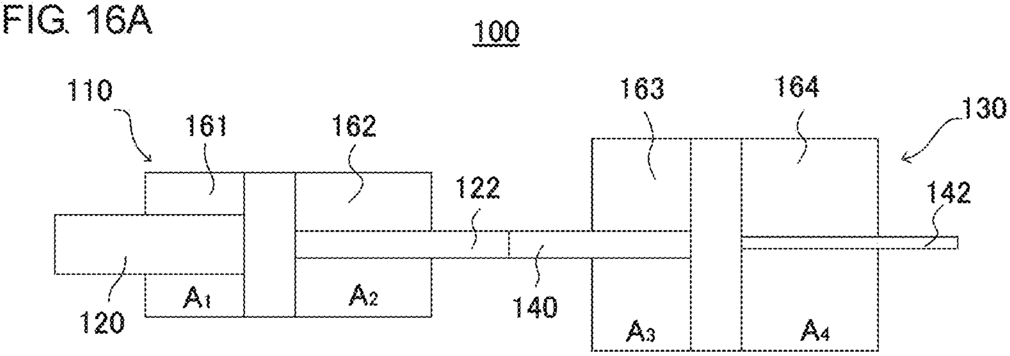
FIG. 16A, FIG. 16B, and FIG. 16C are diagrams showing a basic form of a double cylinder actuator and modified examples 1 and 2.
Figure 16B:
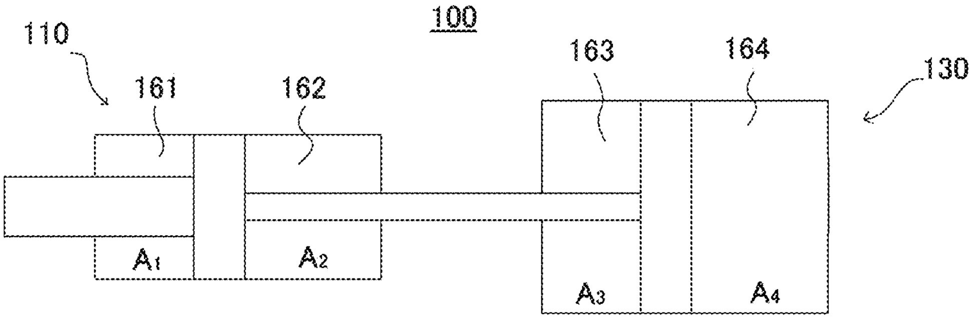
Figure 16C:
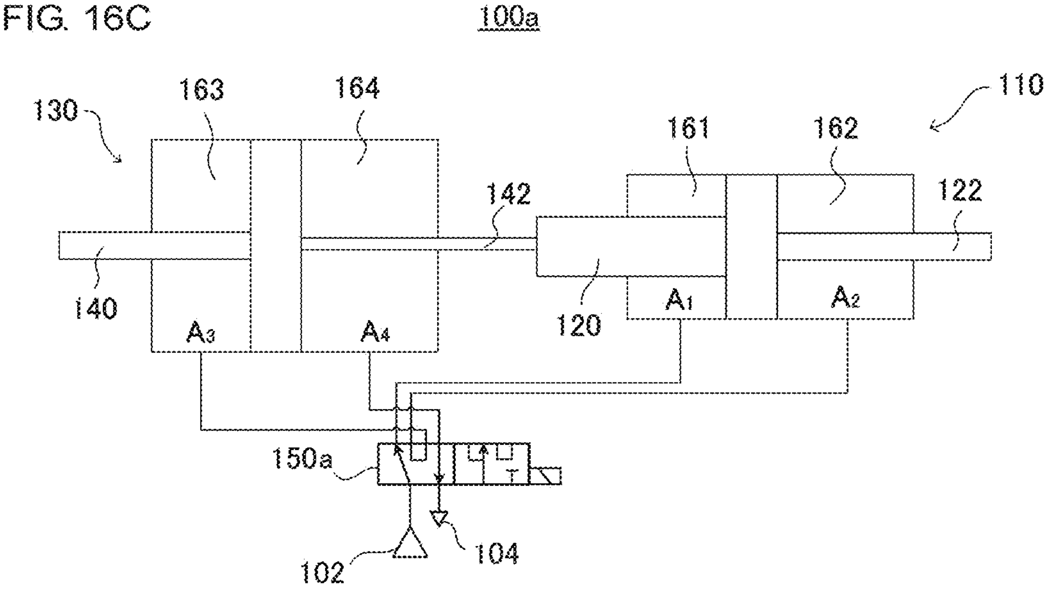

FIG. 16A to 16C are diagrams showing the basic form of the double cylinder actuator 100 and the modified examples 1 and 2 of the double cylinder actuator 100.

FIG. 16A is a basic form of the double cylinder actuator 100, which has the same configuration as that of FIG. 5, and the relationship of $A_1<A_2<A_3<A_4$ is established. In FIG. 16A, the right rod 122 of the first cylinder 110 and the left rod 140 of the second cylinder 130 have the same cross-sectional area.

In the basic form, the first cylinder 110 and the second cylinder 130 were double-ended rod cylinders, but the present invention is not limited thereto. In the first modification of shown in FIG. 16B, a single rod cylinder in which the right rod 142 is omitted is used for the second cylinder 130. Also in this case, the relationship of $A_1<A_2<A_3<A_4$ is maintained.

In the second modification shown in FIG. 16C, the arrangements of the first cylinder 110 and the second cylinder 130 are interchanged.

Figure 17A:
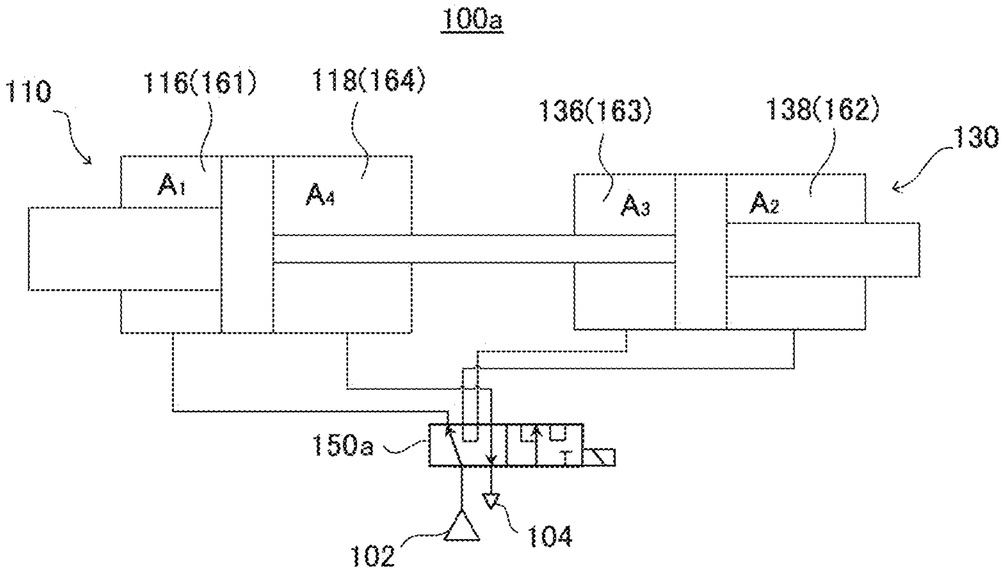
FIG. 17A and FIG. 17B are diagrams showing modification 3 and modification 4 of the double cylinder actuator.
Figure 17B:
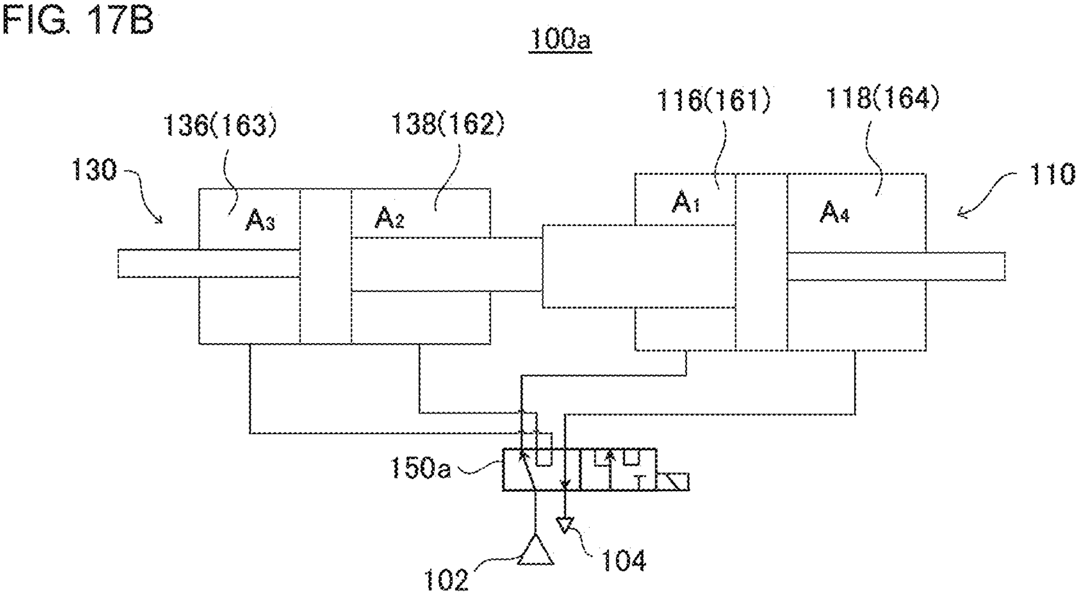

FIG. 17A and FIG. 17B are diagrams showing modified examples 3 and 4 of the double cylinder actuator 100. In the modified example 3 shown in FIG. 17A, the positions of the second air chamber 162 and the fourth air chamber 164 are exchanged in FIG. 16A. That is, the left air chamber 116 of the first cylinder 110 is assigned to the first air chamber 161, the right air chamber 118 of the first cylinder 110 is assigned to the fourth air chamber 164, and the left air chamber 136 of the second cylinder 130 is in assigned to the third air chamber 163, the right air chamber 138 of the second cylinder 130 is assigned to the second air chamber 162. Here, too, the relationship of $A_1<A_2<A_3<A_4$ is established.

Modified example 4 shown in FIG. 17B is obtained by exchanging the first cylinder 110 and the second cylinder 130 in FIG. 17A. Although FIG. 16C and FIG. 17A and FIG. 17B show the case where the control valve 150*a* for the double-acting cylinder is used, it may be replaced with the control valve 150*b* for the single-acting cylinder.

The following techniques can be grasped from FIG. 16A to FIG. 16C, FIG. 17A, and FIG. 17B. The double cylinder actuator 100 includes a first cylinder 110 and a second cylinder 130, and the first piston 114 and the second piston 134 are connected so that these have the same displacement. The first piston 114 has two pressure receiving surfaces, the second piston 134 has two pressure receiving surfaces, and there are a total of four pressure receiving surfaces. Among them, the pressure receiving area of one of the first piston 114 (left side in the figure) is the smallest ($A_1$), and the pressure receiving area on the same side (left side) of the second piston 134 is the third smallest ($A_3$). The two air chambers of the first cylinder 110 and the two air chambers of the second cylinder are referred to as the first air chamber, the second air chamber, the third air chamber, and the fourth air chamber in order from the one having the smallest pressure receiving area to the one having the largest pressure receiving area. Then, in the forward stroke (i), the control valve 150 connects the air pressure source to the first air chamber, connects the second air chamber and the third air chamber, and opens the fourth air chamber to the atmosphere.

Figure 18A:
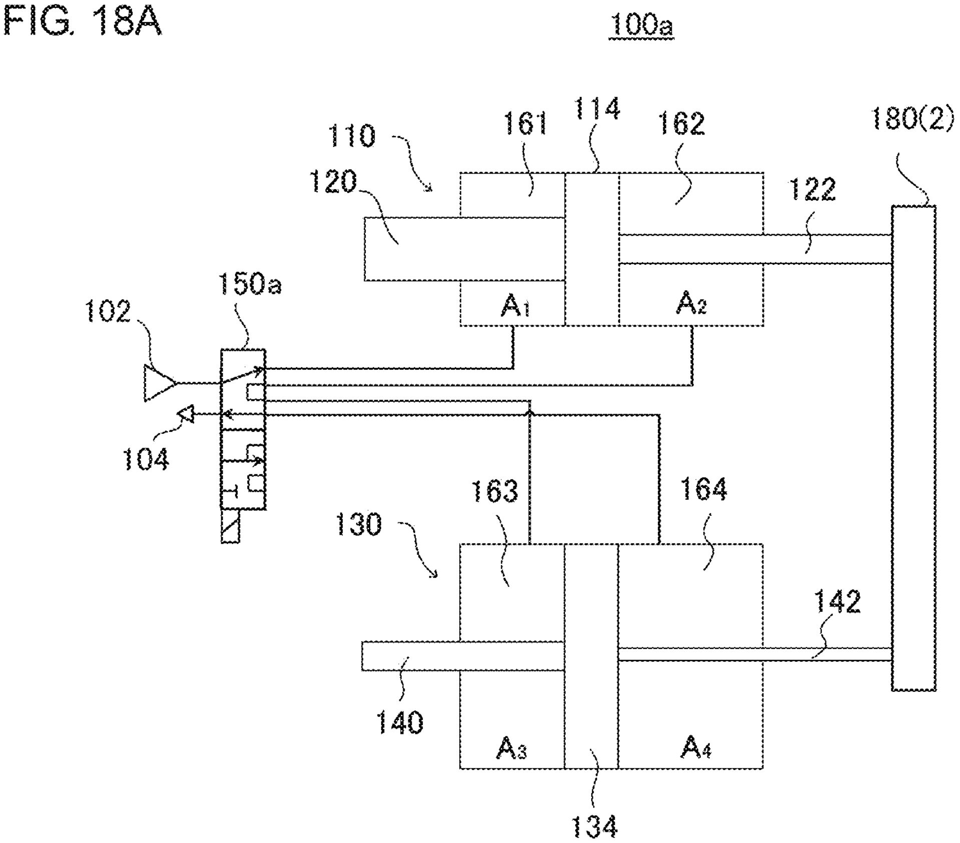
FIG. 18A and FIG. 18B are diagrams showing a double cylinder actuator according to the modified example 5 and the modified example 6.
Figure 18B:
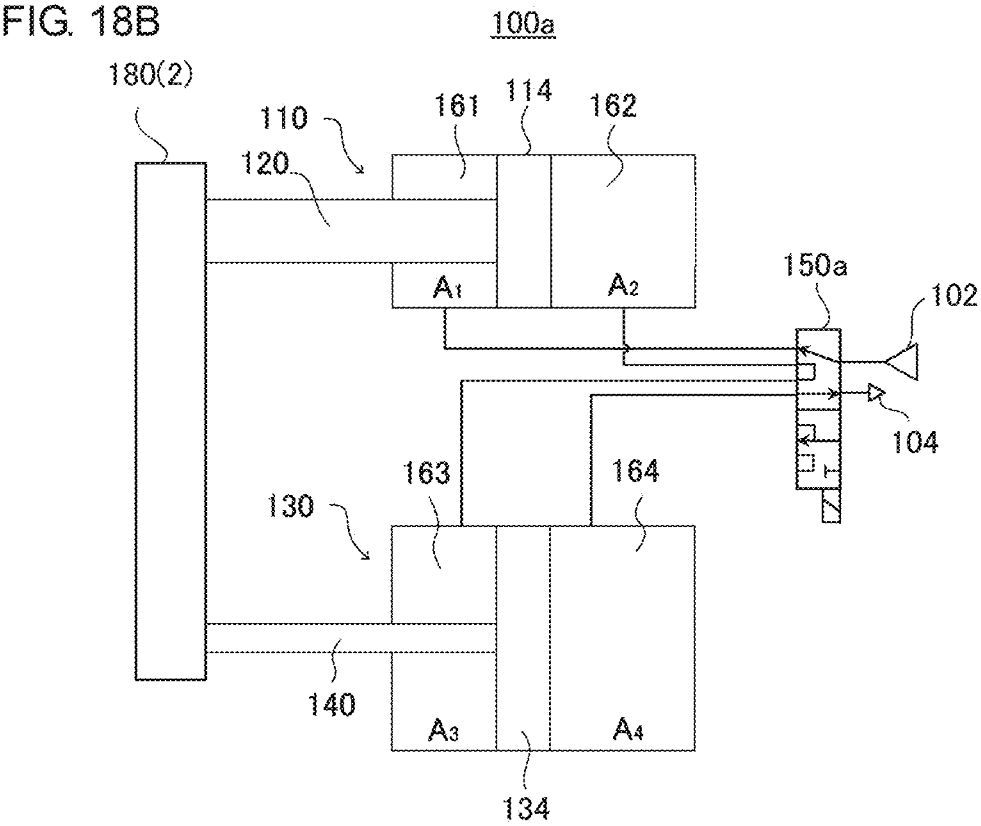

FIG. 18A and FIG. 18B are diagrams showing the double cylinder actuator 100*a* according to the modified example 5 and the modified example 6. In the embodiments so far, the first cylinder 110 and the second cylinder 130 are arranged coaxially, but the present invention is not limited to this.

In the modified example 5 shown in FIG. 18A, the first cylinder 110 and the second cylinder 130 of the double cylinder actuator 100 in FIG. 1 are arranged non-coaxially (in parallel). For example, the first piston 114 and the second piston 134 are connected to each other at the right rods 122 and 142 via the connecting element 180. The connecting element 180 may be the load 2 itself.

In the modified example 6 shown in FIG. 18B the right rod 122 and the right rod 142 are omitted from the modification 5 in FIG. 18A. The first piston 114 and the second piston 134 are connected to each other at the left rods 120 and 140 via the connecting element 180. The connecting element 180 may be the load 2 itself.

Figure 19A:
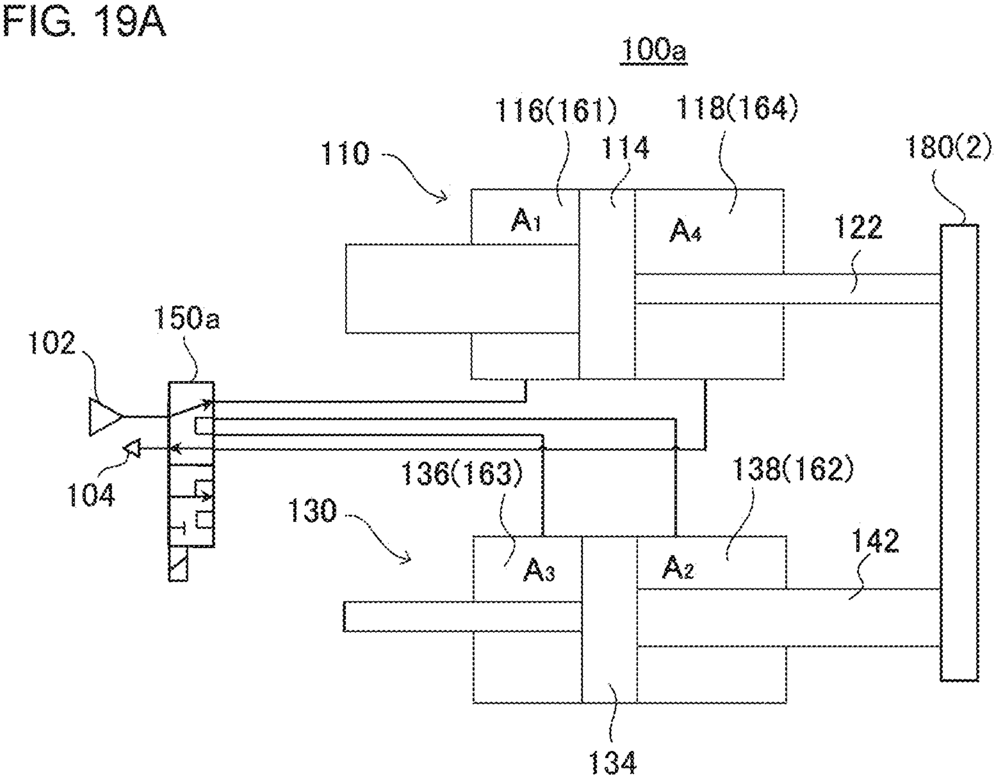
FIG. 19A and FIG. 19B are diagrams showing a double cylinder actuator according to the modified example 7 and the modified example 8.
Figure 19B:
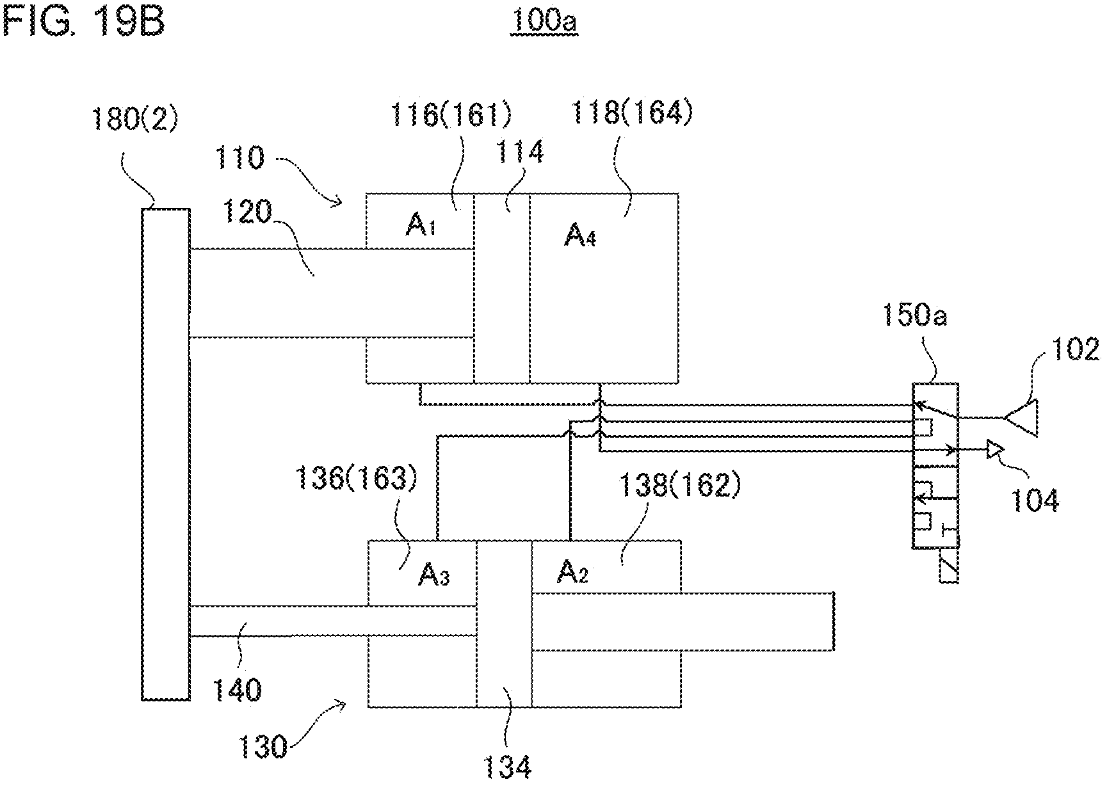

FIGS. 19A and 19B are diagrams showing the double cylinder actuator 100 according to the modified example 7 and the modified example 8. In the modified example 7 shown in FIG. 19A, the first cylinder 110 and the second cylinder 130 of the modified example 3 shown in FIG. 16C are arranged non-coaxially (in parallel). The first piston 114 and the second piston 134 are connected to each other on the right rods 122 and 142 via the connecting element 180. The connecting member 180 may be the load 2 itself.

In the modified example 8 shown in FIG. 19B, the modified example 7 shown in FIG. 19A is rearranged so that the first piston 114 and the second piston 134 are connected to each other via the connecting element 180 on the left rods 120 and 140. Further, in this modified example 8, the right rod 122 is omitted.

Although the control valve 150*a* for the double-acting cylinder is shown in FIG. 18A and FIG. 18B and FIG. 19A and FIG. 19B, the control valve 150*b* for the single-acting cylinder may be replaced.

Figure 20A:
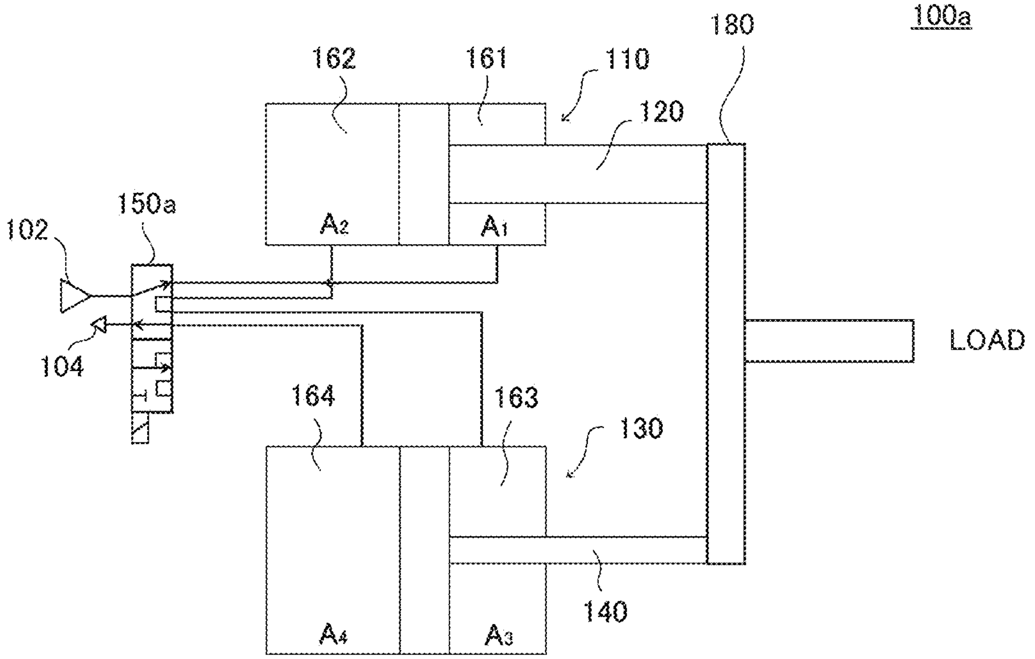
FIG. 20A and FIG. 20B are diagrams showing a double cylinder actuator using a single rod cylinder.
Figure 20B:
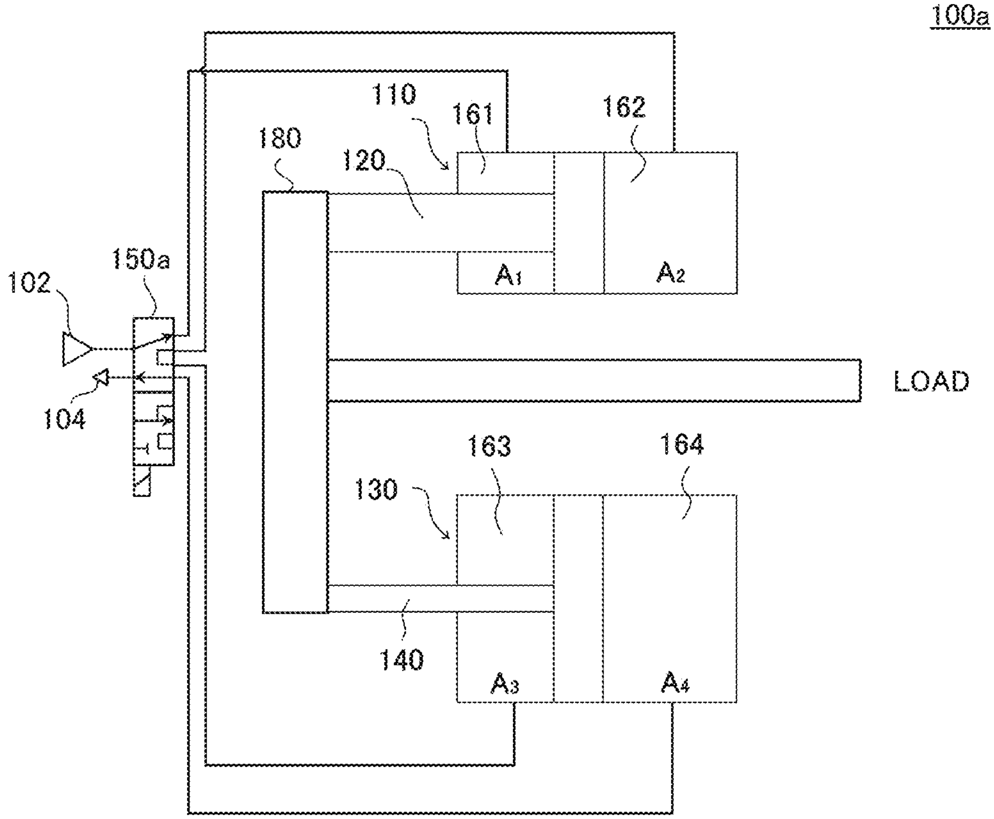

Generally, a single rod cylinder is cheaper than a double-ended rod cylinder. FIG. 20A and FIG. 20B are diagrams showing a double cylinder actuator 100*a* using a single rod cylinder. FIG. 20A shows the double cylinder actuator 100*a* shown in FIG. 18B inverted left and right and acts on the load on the right side of the paper surface. The double cylinder actuator 100*a* pulls the load in the forward stroke and pushes the load in the return stroke. In FIG. 20B, contrary to FIG. 20A, the method of extracting the force is changed so that the load is pushed in the forward stroke and the load is pulled in the return stroke. Although the control valve 150*a* for the double-acting cylinder is shown in FIG. 20A and FIG. 20B, it may be replaced with the control valve 150*b* for the single-acting cylinder.

Figure 21:
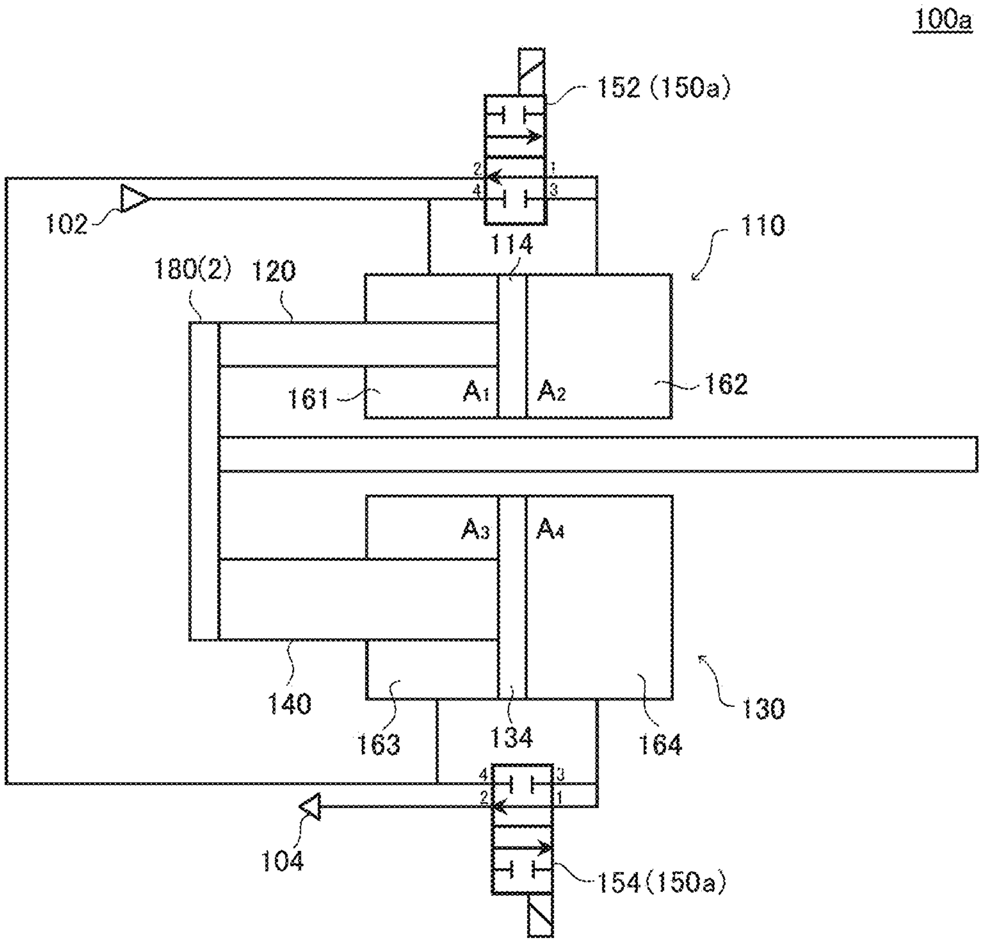
FIG. 21 is a diagram showing a double cylinder actuator 100*a* according to a modification 9.

FIG. 21 is a diagram showing a double cylinder actuator 100*a* according to a modification 9. The double cylinder actuator 100*a* is a double-acting actuator based on the double cylinder actuator 100*a* shown in FIG. 20B, in which the configuration of the control valve 150*a* is changed. In FIG. 21, the control valve 150*a* includes a first control valve 152 and a second control valve 154. The first control valve 152 and the second control valve 154 are 4-port 2-position valves (4-port 2-position directional control valves), respectively. In the first state (first position), the control valves 152 and 154 conduct from the first port (1) to the second port (2), and the third port (3) and the fourth port (4) are closed. In the second state (second position), the first port (1) and the second port (2) of the control valves 152 and 154 are closed and conduct from the fourth port (4) to the third port (3).

The first port (1) and the third port (3) of the first control valve 152 are connected to the second air chamber 162. The second port (2) of the first control valve 152 is connected to the third air chamber 163 and the fourth port (4) of the second control valve 154. The fourth port (4) of the first control valve 152 is connected to the first air chamber 161 and the air pressure source 102. The first port (1) and the third port (3) of the second control valve 154 are connected to the fourth air chamber 164. The second port (2) of the second control valve 154 is connected to the atmosphere 104.

FIG. 21 shows the first control valve 152 and the second control valve 154 in the first position, whereby the forward stroke can be realized. When the first control valve 152 and the second control valve 154 are switched to the second position, the return stroke can be realized. The 4-port 2-position directional control valve or the 4-port 3-position directional control valve with the added function of a closed center is a general-purpose component. Therefore, the double cylinder actuator 100*a* in FIG. 21 can be realized at low cost by using a commercially available product.

Figure 22:
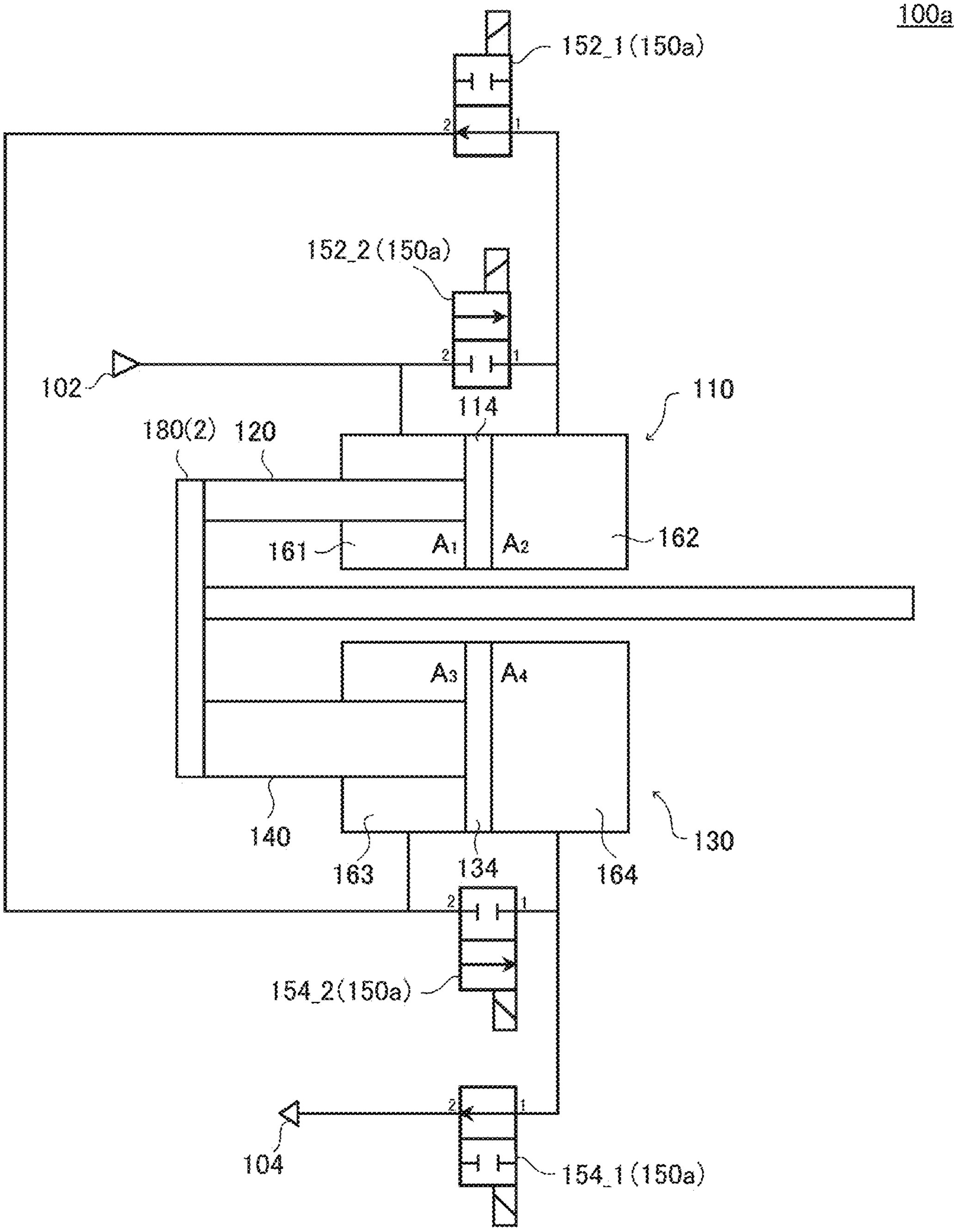
FIG. 22 is a diagram showing a double cylinder actuator according to a modification 10.

FIG. 22 is a diagram showing a double cylinder actuator 100*a* according to the modified example 10. In this double cylinder actuator 100*a*, the two control valves in FIG. 21 are divided into four valves. The first control valve 152 is divided into two 2-port 2-position directional control valves 152_1 and 152_1. Further, the second control valve 154 is divided into two 2-port 2-position directional control valves 154_1 and 154_1. Since the 2-port 2-position directional control valve is a general-purpose component, it can be realized at low cost by using a commercially available product.

Figure 23:
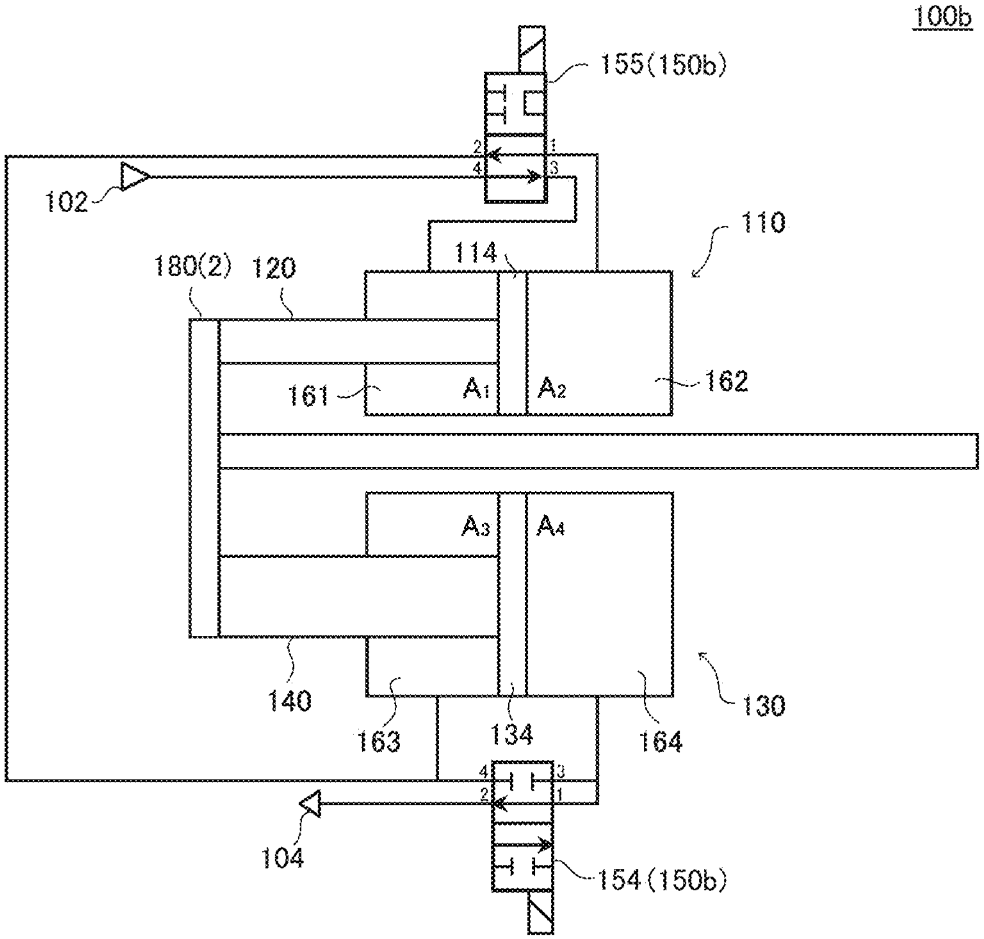
FIG. 23 is a diagram showing a double cylinder actuator according to a modification 11.

FIG. 23 is a diagram showing a double cylinder actuator 100*b* according to a modification 11. The double cylinder actuator 100*b* is a modification of the double cylinder actuator shown in FIG. 21 into a single acting cylinder. The control valve 150*b* includes a first control valve 155 and a second control valve 154. The configuration of the second control valve 154 is the same as that of the second control valve 154 in FIG. 21. The first control valve 155 is a 4-port 2-position directional control valve. The first port (1) of it is connected to the second air chamber 162, the second port (2) is connected to the third air chamber 163 and the fourth port (4) of the second control valve 154. The third port (3) is connected to the first air chamber 161 and the fourth port (4) is connected to the air pressure source 102.

In the first state (first position), the first control valve 155 conducts from the first port (1) toward the second port (2), and from the fourth port (4) toward the third port (3). In the second state (second position), the first control valve 155 conducts from the third port (3) to the first port (1), and the second port and the fourth port are closed.

In FIG. 23, the first control valve 155 and the second control valve 154 are in the first position, whereby the forward stroke can be realized. When the first control valve 155 and the second control valve 154 are switched to the second position, the return stroke can be realized. A general-purpose product can be used for the second control valve 154.

Following the modification of FIG. 22, the 4-port directional control valve shown in FIG. 23 may be divided into a 2-port directional control valves.

In addition to what is shown here, there are various modifications in the configurations of the control valves 150*a* and 150*b*, and such modifications are also included in the scope of the present disclosure.

OTHER MODIFICATION EXAMPLE

In the embodiment, the double cylinder actuator 100 is composed of a combination of cylinders with two rods, but the present invention is not limited to this.

For example, the double cylinder actuator 100 may be configured by combining two guided cylinders.

Alternatively, the double cylinder actuator 100 can be configured by combining two rodless cylinders. There are two types of rodless cylinders: slit type and magnet type. When the slit type is used, the cushion pipe extending from the center of the cylinder head can be used. That is, the cushion pipe may be extended to the piston, and the pressure receiving area may be changed like a rod according to the cross-sectional area of the cushion pipe. Furthermore, even when the magnet type is adopted, the pressure receiving area can be adjusted according to the cross-sectional area of the rod by adding a rod inside.

As described above, the configuration of the cylinders constituting the double cylinder actuator 100 is not particularly limited. It can be configured by combining various cylinders having different pressure receiving areas on both sides of the piston that divides the air chamber into two.

In the embodiment, the double cylinder actuator 100 including two cylinders has been described, but the number of cylinders may be increased to three, four, . . . This will be generalized and referred to as a multi-cylinder actuator. The multi-cylinder actuator has the following features.

The multi cylinder actuator includes a plurality of N cylinders (N 2) and a control valve. Each of the N cylinders includes a cylinder tube and a piston that divides the space inside the cylinder tube into two air chambers. The pistons of each of the N cylinders are connected so that the displacements are equal. The pressure receiving area of one of the i-th ($1 \leq i \leq N$) pistons is the $(2i-1)$th smallest. The two air chambers of N cylinders (2N air chambers in total) are called the first air chamber, second air chamber, . . . , $(2N-1)$th air chamber, and (2N)th air chamber in order from the one with the smallest pressure receiving area to the one with the largest pressure receiving area. In the forward stroke, the control valve (i) connects the air pressure source to the first air chamber, opens the (2N)th air chamber to the atmosphere, and connects the other two adjacent pairs of air chambers.

In the return stroke, in the case of a double-acting multi-cylinder actuator, the control valve (ii) connects the first air chamber and the second air chamber to the air pressure source. Further, for the third air chamber to the (2N)th air chamber, a pair of two adjacent air chambers is connected.

In the return stroke, in the case of single-acting multi cylinder actuator, the control valve (iii) connects a pair of two adjacent air chambers from the first air chamber to the (2N)th air chamber.

Although the present disclosure has been described using specific terms based on the embodiments, the embodiments merely indicate the principles and applications of the present disclosure. In the embodiments, many modifications and arrangement changes are permitted without departing from the ideas of the present invention defined in the claims.

What is claimed is:

1. A pneumatic actuator comprising:

a first cylinder including a first cylinder tube and a first piston that divides a space inside the first cylinder tube into two air chambers;

a second cylinder including a second cylinder tube and a second piston that divides a space in the second cylinder tube into two air chambers, wherein the second piston is connected to the first piston so that the first piston and the second piston have the same displacement; and a control valve, wherein, among two pressure receiving surfaces of the first piston and two pressure receiving surfaces of the second piston, one of the two pressure receiving surfaces of the first piston has a smallest cross-section area and one of the two pressure receiving surfaces on the same side of said one of the two pressure receiving surfaces of the first piston has a third smallest cross-section area, and wherein the two air chambers of the first cylinder and the two air chambers of the second cylinder are referred to as, in ascending order in the cross-section area, a first air chamber, a second air chamber, and a third air chamber and a fourth air chamber, the control valve is operable to position the pneumatic actuator such that in a forward stroke of the first and second piston an air pressure source is connected only to the first air chamber, the second air chamber is connected only to the third air chamber, and only the fourth air chamber is opened to the atmosphere.

2. The pneumatic actuator according to claim 1, wherein the control valve is operable to position in the pneumatic actuator in a return stroke such that the air pressure source is connected only to the first air chamber and the second air chamber, and the third air chamber is connected only to the fourth air chamber.

3. The pneumatic actuator according to claim 1, wherein the control valve is operable to position the pneumatic actuator in a return stroke such that the first air chamber is connected only to the second air chamber in a state of being separated from the air pressure source, and the third air chamber is connected only to the fourth air chamber.

4. The pneumatic actuator according to claim 1, wherein the first cylinder and the second cylinder are arranged non-coaxially.

5. The pneumatic actuator according to claim 4, wherein the first air chamber and the second air chamber are formed in one of the first cylinder and the second cylinder, and the third air chamber and the fourth air chamber are formed in the other of the first cylinder and the second cylinder.

6. The pneumatic actuator according to claim 5, wherein the first cylinder and the second cylinder are single-rod cylinders.

7. The pneumatic actuator according to claim 1, wherein the first cylinder and the second cylinder are arranged coaxially.

8. The pneumatic actuator according to claim 1, wherein the control valve includes a 4-port first control valve and a 4-port second control valve, wherein each 4-port control valve has a first port, a second port, a third port and a fourth port and is switchable between a first position and a second position, wherein (a) in the first position, the first port communicates with the second port, and the third port and the fourth port are closed, (b) in the second position, the first port and the second port are closed, and the fourth port communicates with the third port, wherein the first port and the third port of the first control valve are connected to the second air chamber, and the second port of the first control valve is connected to the third air chamber and the fourth port of the second control valve, the fourth port of the first control valve is connected to the first air chamber and the pneumatic source, the first port and the third port of the second control valve are connected to the fourth air chamber, and the second port of the second control valve is connected to the atmosphere.

9. A pneumatic actuator comprising:

a plurality of N (N≥2) cylinders, each including a cylinder tube and a piston that divides the space inside the cylinder tube into two air chambers; and a control valve, wherein a plurality of the pistons of the plurality of N cylinders are connected each other so that the plurality of the pistons have the same displacement, wherein among all pressure receiving surfaces of the pistons of each of the N cylinders, a cross-section area of one pressure receiving surface of the i-th (1≤i≤N) pistons is the (2i−1)th smallest, wherein the two air chambers of the plurality of N cylinders are referred to as a first chamber, a second chamber, ... a (2N−1)th chamber, and a (2N)th chamber in ascending order in cross-section area, respectively, and wherein the control valve is operable to position the pneumatic valve in a forward stroke such that an air pressure source is connected only to the first air chamber, only the (2N)th air chamber is connected to the atmosphere, the second air chamber is connected only to the third air chamber, the fourth air chamber is connected only to the fifth air chamber, . . . , and the (2N−2)th air chamber is connected only to the (2N−1)th air chamber.

* * * * *